United States Patent
Naik et al.

(10) Patent No.: US 12,219,467 B2
(45) Date of Patent: Feb. 4, 2025

(54) NETWORK MANAGEMENT FRAME FOR MLO AND MBSSID

(71) Applicant: QUALCOMM Incorporated, San Diego, CA (US)

(72) Inventors: Gaurang Naik, San Diego, CA (US); Abhishek Pramod Patil, San Diego, CA (US); Yanjun Sun, San Diego, CA (US); Abdel Karim Ajami, San Diego, CA (US); Alfred Asterjadhi, San Diego, CA (US); George Cherian, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 17/651,136

(22) Filed: Feb. 15, 2022

(65) Prior Publication Data

US 2023/0262585 A1 Aug. 17, 2023

(51) Int. Cl.
*H04W 76/11* (2018.01)
*H04W 48/08* (2009.01)
*H04W 48/16* (2009.01)
*H04W 76/15* (2018.01)

(52) U.S. Cl.
CPC ........... *H04W 48/16* (2013.01); *H04W 48/08* (2013.01); *H04W 76/15* (2018.02)

(58) Field of Classification Search
CPC ..... H04W 8/005; H04W 24/02; H04W 40/24; H04W 40/248; H04W 48/08; H04W 48/12; H04W 48/16; H04W 76/15; H04W 76/11; H04W 84/12; H04W 88/08
See application file for complete search history.

(56) References Cited

U.S. PATENT DOCUMENTS

| 11,540,200 | B2* | 12/2022 | Chu | H04L 45/24 |
| 11,805,470 | B2* | 10/2023 | Kwon | H04W 76/11 |
| 2019/0268956 | A1* | 8/2019 | Xiao | H04W 76/15 |
| 2021/0274574 | A1* | 9/2021 | Ghosh | H04W 76/11 |
| 2021/0368419 | A1 | 11/2021 | Kwon et al. | |
| 2022/0124855 | A1* | 4/2022 | Hu | H04W 76/34 |

FOREIGN PATENT DOCUMENTS

WO 2021238578 A1 12/2021

OTHER PUBLICATIONS

Bellalta et al., Multi-link Operation in IEEE 802.11be WLANs, arXiv, 7 pages, Jan. 19, 2022.*
International Search Report and Written Opinion—PCT/US2023/012146—ISA/EPO—May 12, 2023.

\* cited by examiner

*Primary Examiner* — Frank Duong
(74) *Attorney, Agent, or Firm* — Procopio, Cory, Hargreaves & Savitch LLP

(57) ABSTRACT

A transmitting (Tx) access point (AP) multi-link device (MLD) may be configured to designate a parent ML element and at least one child ML element in the network management frame, e.g., the beacon frame or probe response frame, and at least one non-AP MLD may be configured to receive the network management frame and apply the parent ML element to the child ML element.

30 Claims, 19 Drawing Sheets

NETWORK MANAGEMENT FRAME FOR MLO AND MBSSID

TECHNICAL FIELD

The present disclosure relates generally to communication systems, and more particularly, to a network management frame for multi-link operation (MLO) and multi-basic service set identifier (MBSSID).

INTRODUCTION

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a transmitting (Tx) access point (AP) multi-link device (MLD) associated with at least one multi-basic service set identifier (MBSSID) and a non-AP MLD associated with at least one MBSSID. The Tx AP MLD may be configured to designate a parent ML element and at least one child ML element in the network management frame, e.g., the beacon frame or probe response frame, and at least one non-AP MLD may be configured to receive the network management frame and apply the parent ML element to the child ML element.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
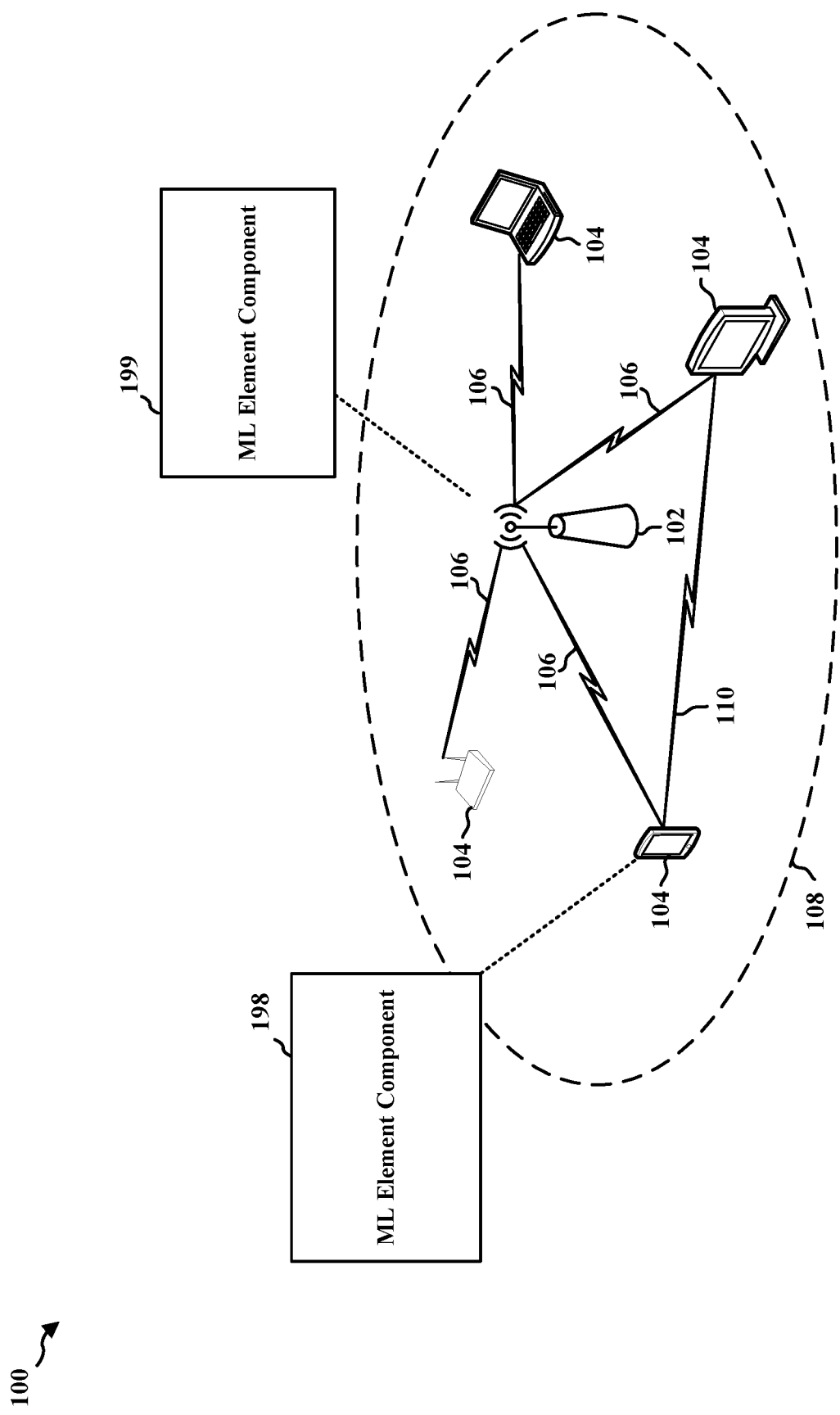
FIG. 1 is a diagram illustrating an example wireless communication network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

Various aspects relate generally to a network management frame for MLO and MBSSID. Some aspects more specifically relate to providing a transmitting (Tx) access point (AP) multi-link device (MLD) to provide the network management frame including a parent ML element and at least one child ML element, and at least one non-AP MLD to apply the parent ML element to the child ML element.

Particular aspects of the subject matter described in this disclosure can be implemented to realize one or more of the following potential advantages. In some examples, the described techniques can be used to provide ML elements while avoiding or reducing beacon bloating.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or CCC20 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload. The wireless communication system may be implemented by a set of network nodes and/or a set of network entities. A network node can be implemented as an access point (AP), an aggregated AP or base station, as a disaggregated AP or base station, an integrated access and backhaul (IAB) node, a relay node, a sidelink node, etc. A network entity can be implemented in an aggregated or monolithic AP or base station architecture, or alternatively, in a disaggregated AP or base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

Referring again to FIG. 1, in certain aspects, the STA 104 may include an ML element component 198 configured to receive a network management frame from a network node configured with a plurality of radio links, each radio link being configured with at least one MBSSID for the ML device, identify a parent ML element from at least one ML element of the network management frame, and identify the at least one child ML element for the ML device based on the parent ML element. In certain aspects, the AP 102 may include an ML element component 199 configured to designate at least one ML element in a network management frame as a parent ML element, generate the network management frame including the parent ML element, and at least one child ML element associated with the parent ML element, and transmit the network management frame to at least one ML device associated with at least one BSSID of the MBSSID. Although the following description may be focused on IEEE 802.11 protocol, the concepts described herein may be applicable to other similar areas, such as 5G NR, LTE, LTE-A, CDMA, GSM, and other wireless technologies.

Figure 2:
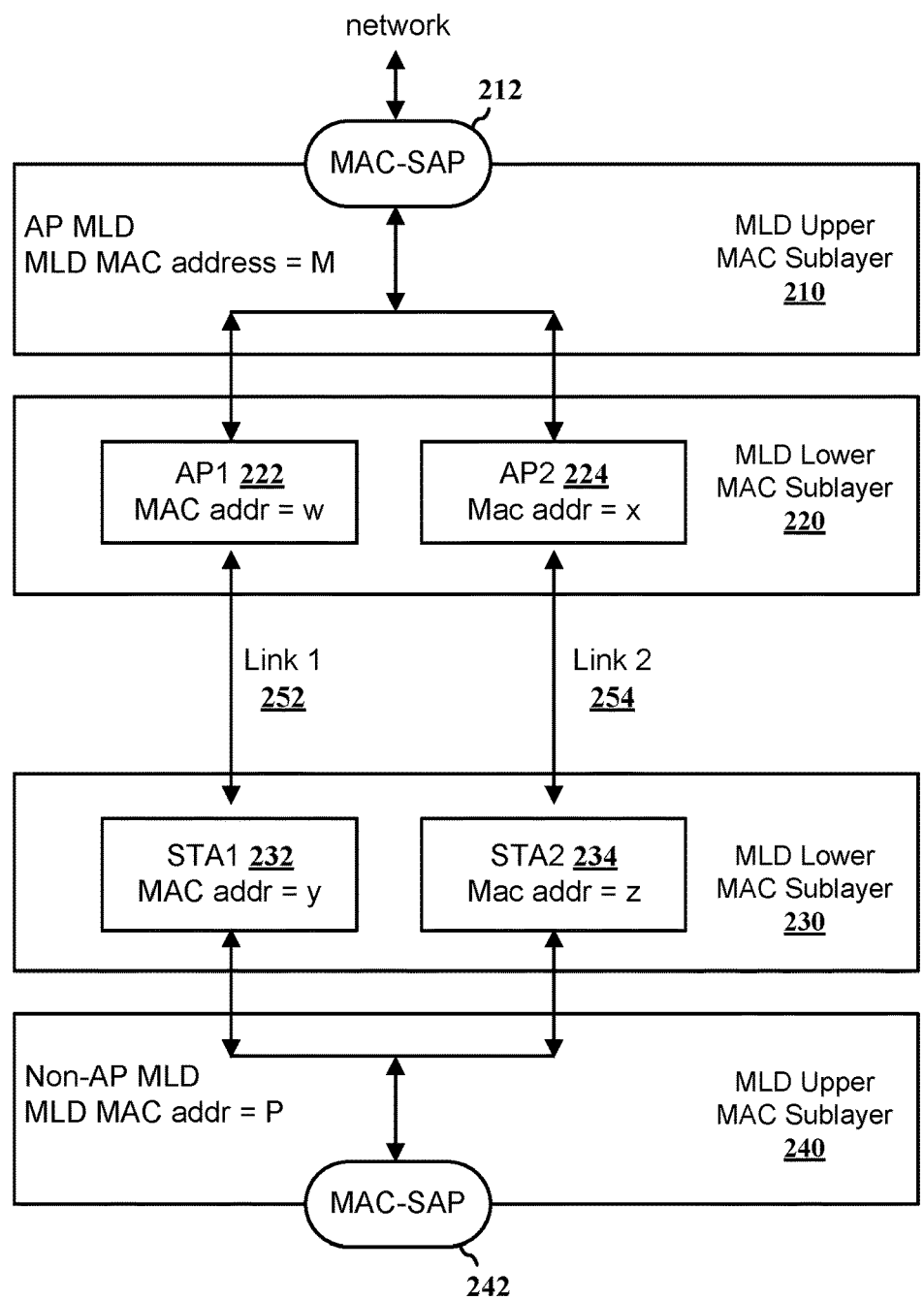
FIG. 2 is a wireless network including MLO and MBSSID.

FIG. 2 is an architecture of wireless network 200 including MLO and MBSSID. The wireless network 200 may include an ML device (MLD) upper MAC sublayer 210 including an AMC layer service access point (MAC-SAP) 212 connected to the network, an MLD lower MAC sublayer 220 including a first AP 222 and a second AP 224. Here, the first AP 222 and the second AP 224 are APs associated with different links. For example, the first AP 222 may be associated with a first link 252, e.g., 2.4 GHz link, and the second AP 224 may be associated with a second link 254, e.g., 6 GHz. Each of the first AP 222 and the second AP 224 may have their MAC addresses. That is, the first AP 222 may be have the first MAC address of w, and the second AP 224 may have the second MAC address of x.

The MLO may create a logical entity of AP MLD, and create the MLD upper MAC sublayer 210 and the MLD lower MAC sublayer 220. The MLD lower MAC sublayer may operate in a similar manner as the MAC layer of a single link operation. That is, MLD lower MAC sublayer may perform operations such as channel contention (e.g., contending for the channel access) block access associated with relevant parameters. On the other hand, certain aspects, such as providing security context and maintaining the queues, may be performed at the MLD upper MAC layer. For example, when the AP MLD receives data queues from the network, the data queues may be received at the MAC-SAP 212 of the MLD upper MAC sublayer 210. From the perspective of the network, the MLD MAC address of the AP MLD is M, and communicates with the AP MLD as a single entity.

Without the MLO, a non-AP network device may access the AP MLD through one of the APs, the first AP 222 or the second AP 224, independently, and connect to the network through one of the APs, the first AP 222 or the second AP 224.

A non-AP MLD that supports the MLO may include an MLD lower MAC sublayer 230 including a first STA 232 and a second STA 234 that may respectively form links with the first AP 222 and the second AP 224. That is, the first STA 232 may form the first link 252 with the first AP 233, and the second STA 234 may form the second link 254 with the second AP 224. For example, the first link 252 between the first AP 222 and the first STA 232 may be a 2.4 GHz band and the second link 254 between the second AP 224 and the second STA 234 may be a 5 GHz band. Each of the first STA 232 and the second STA 234 may have their MAC addresses. That is, the first STA 232 may be have the first MAC address of y and the second STA 234 may have the second MAC address of z. Here, a STA may refer to a network device, and may include an AP or non-AP.

The MLO may create a logical entity of non-AP MLD, and create the MLD upper MAC sublayer 240 and the MLD lower MAC sublayer 230. The MLD lower MAC sublayer may operate in a similar manner as the MAC layer of a single link operation. On the other hand, certain aspects, such as providing security context and maintaining the data queues, may be performed at the MLD upper MAC layer. For example, the MLD upper MAC sublayer 240 may communicate with the higher layers through the MAC-SAP 242, and from the perspective of the higher layers, the higher layers may communicate with the non-AP MLD as a single entity having the MLD MAC address of P.

The AP MLD and the non-AP MLD may schedule the data queue using the first AP 222 and the second AP 224 and the first STA 232 and the second STA 234. Accordingly, the AP MLD and the non-AP MLD may communicate using the multi-link to improve the overall performance of the wireless communication and reduce the latency.

Figure 3:
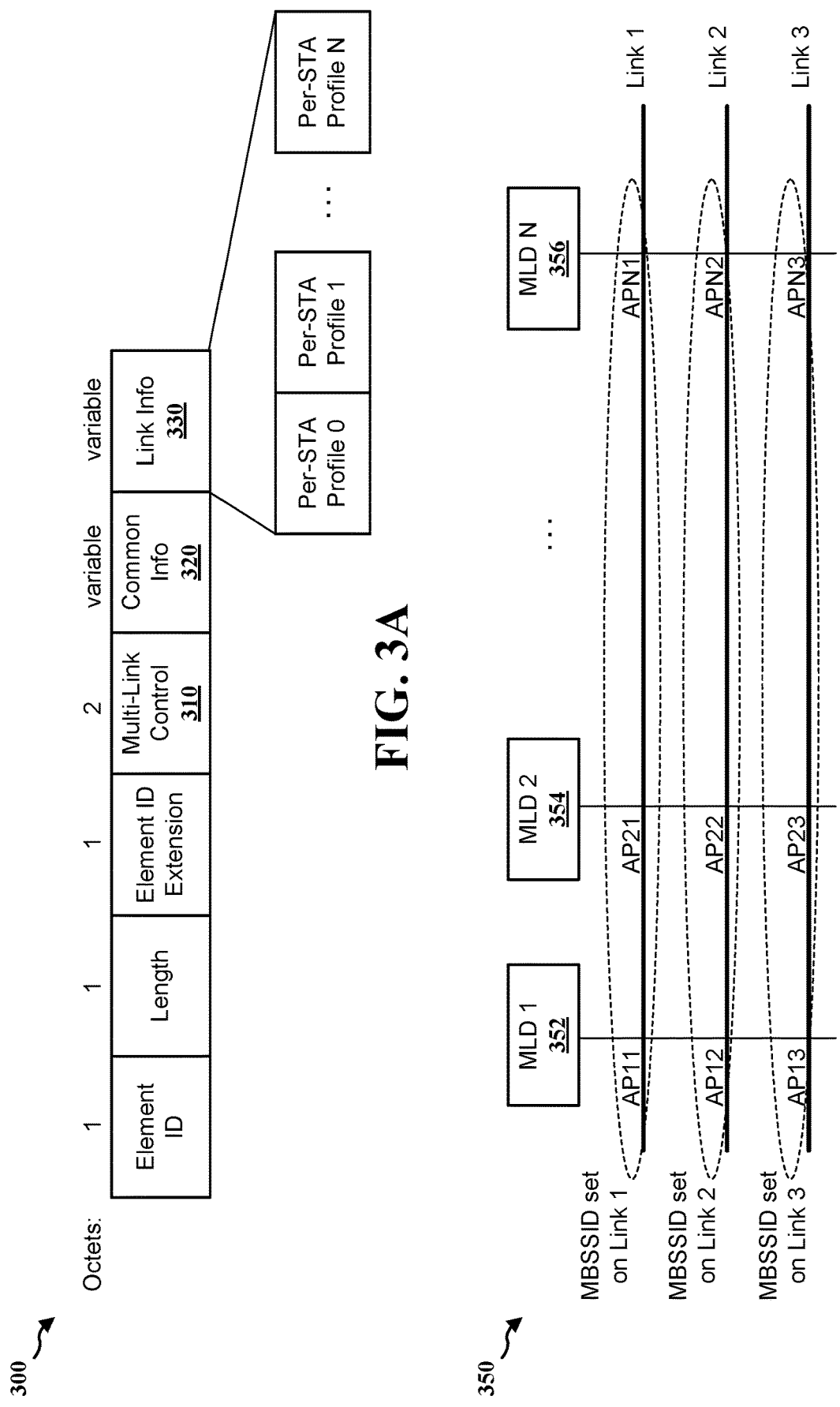
FIG. 3A is an ML element of a method of wireless communication.
FIG. 3B is a wireless network including MLO and MBSSID.

FIG. 3A is an ML element 300 (or information element (IE)) of a method of wireless communication. When the AP MLD and the non-AP MLD both support the MLO, the AP MLD may transmit MLO-specific information to the non-AP MLD. The ML element 300 is a container of the MLO-specific information that may be sent by a transmitting (Tx) MLD to the non-AP-MLD to transmit the MLO-specific information. The ML element may carry a complete network profile of the associated station or a part of the complete network profile of the associated station. That is, in one aspect, the ML element 300 may transmit a complete profile including the complete information of the associated STAs. In another aspect, the ML element 300 may transmit a partial profile including a subset of the complete profile. The ML element 300 may include an element ID field, an element length field, an element ID extension field, and further include MLO specific information fields such as an ML control field 310, a common information field 320, or a link information field 330. Each information field may have different sizes. For example, the element ID field, the element length field, and the element ID extension field may each have 1 octet, the ML control field 310 may have 2 octets, and the common information field 320 and the link information field 330 may have variable size, e.g., octets. Here, the ML control field 310 may indicate the type of the ML element 300, and be the controller for the common information field 320. For example, the common information field 320 may include information, and the ML control field 310 may signal which information is present or included in the common information field 320.

The common information field 320 and the link information field 330 may indicate the MLD-level information. The common information field 320 may indicate the MLD-level information that is common to all the stations of the MLD. The link information field 330 may indicate MLD-level information that is link-specific information (e.g., specific to each station). For example, in case the MLO includes a 2.4 GHz AP station and a 5 GHz AP station for the logical MLD, the common information field 320 may include the MLD-level information that is common to the 2.4 GHz AP station and the 5 GHz AP station, whereas the link information field 330 may indicate the MLD-level information that is specific to the 2.4 GHz AP station and the 5 GHz AP station. For example, an AP MLD may support three links including a 2.4 GHz link, a 5 GHz link, and a 6 GHz link, and each of the 2.4 GHz link, the 5 GHz link, and the 6 GHz link may transmit beacon frames.

A beacon frame transmitted on 2.4 GHz link may carry the ML element. The ML element may include the common information field, which may carry the MLD-level capabilities, e.g., the number of the links (three links), support for non-AP MLD operations such as a traffic identifier (TID)-Link support or enhanced multi-link single radio (MLSR) (eMLSR) support, etc.), and up to two per-station profiles, e.g., one profile each for 5G AP and 6G AP. Here, the MLO-specific information of the 2.4 GHz AP is in the beacon frame, which may be hereafter referred to as the core frame. That is, the beacon frame transmitted on the 2.4 GHz link may include the MLO-specific information of the 2.4 GHz AP on the beacon frame, and the MLO-specific information for the 5 GHz and the 6 GHz may be included in the link information field, which may be included based on the network configuration. In this case, the 2.4 GHz AP may be referred to as the reporting AP and each of the 5 GHz AP and the 6 GHz AP may be referred to the reported AP.

A beacon frame transmitted on 5 GHz link may carry the ML element. The ML element may include the common information field, which may carry the MLD-level capabilities, e.g., the number of the links (three links), support for non-AP MLD operations such as an TID-Link support or EMLSR support, etc.), and up to two per-station profiles, e.g., one profile each for 2.4 GHz AP and 6 GHz AP. Here, the MLO-specific information of the 5 GHz AP is in the beacon (i.e., core) frame. That is, the beacon frame transmitted on the 5 GHz link may include the MLO-specific information of the 5 GHz AP on the beacon frame, and the MLO-specific information for the 2.4 GHz and the 6 GHz may be included in the link information field, which may be included based on the network configuration. In this case, the 5 GHz AP may be referred to as the reporting AP and each of the 2.4 GHz AP and the 6 GHz AP may be referred to the reported AP.

A beacon frame transmitted on 6 GHz link may carry the ML element. The ML element may include the common information field, which may carry the MLD-level capabilities, e.g., the number of the links (three links), support for non-AP MLD operations such as an TID-Link support or EMLSR support, etc.), and up to two per-station profiles, e.g., one profile each for 2.4 GHz AP and the 5 GHz AP. Here, the MLO-specific information of the 6 GHz AP is in the beacon (i.e., core) frame. That is, the beacon frame transmitted on the 6 GHz link may include the MLO-specific information on the beacon frame, and the MLO-specific information for the 2.4 GHz and the 5 GHz may be included in the link information field, which may be included based on the network configuration. In this case, the 6 GHz AP may be referred to as the reporting AP and each of the 2.4 GHz AP and the 5 GHz AP may be referred to the reported AP.

Since more information may be included in the beacon frame, the information carried in the ML element in the beacon frames may be limited to avoid or reduce beacon bloating. In one aspect, some legacy devices may not be configured to decode beacon frames if the size is greater than a threshold size, e.g., 1800 bytes, and the device that may not decode the beacon frames may eventually be disassociated from the AP if beacon frames are consistently greater than the threshold size, e.g., 1800 bytes.

In some aspects, various mechanisms, such as an inheritance in the ML element or an inheritance in the MBSSID element, may be provided to improve the efficiency of the information dissemination.

FIG. 3B is a wireless network 350 including MLO and MBSSID. The wireless network 350 may include three links. A link 1 may have a first MBSSID set (or a first set of APs) AP11, AP21, . . . , APN1, a link 2 may have a second MBSSID set (or a second set of APs) AP12, AP22, . . . , APN2, and link 3 may have a third MBSSID set (or a third set of APs) AP13, AP23, . . . , APN3. Also, the wireless network 350 may include a first MLD 352 affiliated with AP11, AP12, and AP13, a second MLD 354 associated with AP21, AP22, and AP23, and an $N^{th}$ MLD 356 associated with APN1, APN2, and APN3.

For example, the networks may support 16 BSSIDs in an MBSSID set, and one BSSID, e.g., one AP within an MBSSID set, may be configured to transmit beacon frame or probe response frame. The AP configured to transmit the beacon frames may be referred to as the TxBSSID and other BSSID may be referred to as the non-TxBSSIDs. In some aspects, each BSSID in the MBSSID set may be referred to as a Virtual Access Point (VAP).

In some aspects, one AP, e.g., AP11 of an AP MLD may be in an MBSSID set and is the TxBSSID, and a network management frame, e.g., a beacon frame or a probe response frame, may include an ML element, which includes information of AP12 and AP13, an MBSSID element, which includes information of AP21, . . . , APN1, and an ML sub-element within the MBSSID element, which includes information of AP22, . . . , AP N3. In the network management frame, ML element carried by the TxBSSID (e.g., AP11) may include a common information field, which provides the information that applies to the MLD-level of MLD 1 352.

In some aspects, the reporting AP, e.g., AP11, may include a set of information elements (IEs) in the link information field of the reported AP, e.g., AP21, which may be applied to link information fields of the other AP STA profiles. Then the reporting AP may include these elements in the link information field (i.e., link info field) of the reported AP. For example, the ML element of the AP11 may include Per-STA profile corresponding to the AP12 in the link information field. Accordingly, Inheritance, e.g., application of same IE from the core frame across the same link for MBSSID or same MLD for MLO, may reduce some beacon bloating.

Various aspects of the current disclosure may further provide inheritance mechanisms that may provide MLO-specific information for the AP STAs that are not on the same link as the transmitting AP or the same MLD as the transmitting AP. In one aspect, the reported AP, e.g., AP12, may be configured to switch channels, and the link information field of the reporting AP may include a set of IEs, e.g., channel switching announcement (CSA) IE, enhanced CSA (eCSA) IE, maximum channel switching time IE, or Channel Switch Wrapper IE. Here, in the channel switching procedure, the same IE may be applicable to link information fields of the other AP STA profiles, such as AP22. In another aspect, the reported AP, e.g., AP12, may be configured to enforce channel quieting, and the link information field of the reporting AP may include a set of IEs, e.g., quiet IE or quiet channel IE. Here, in the channel quieting procedure, the same IE may be applicable to link information fields of the other AP STA profiles, such as AP22.

Figure 4:
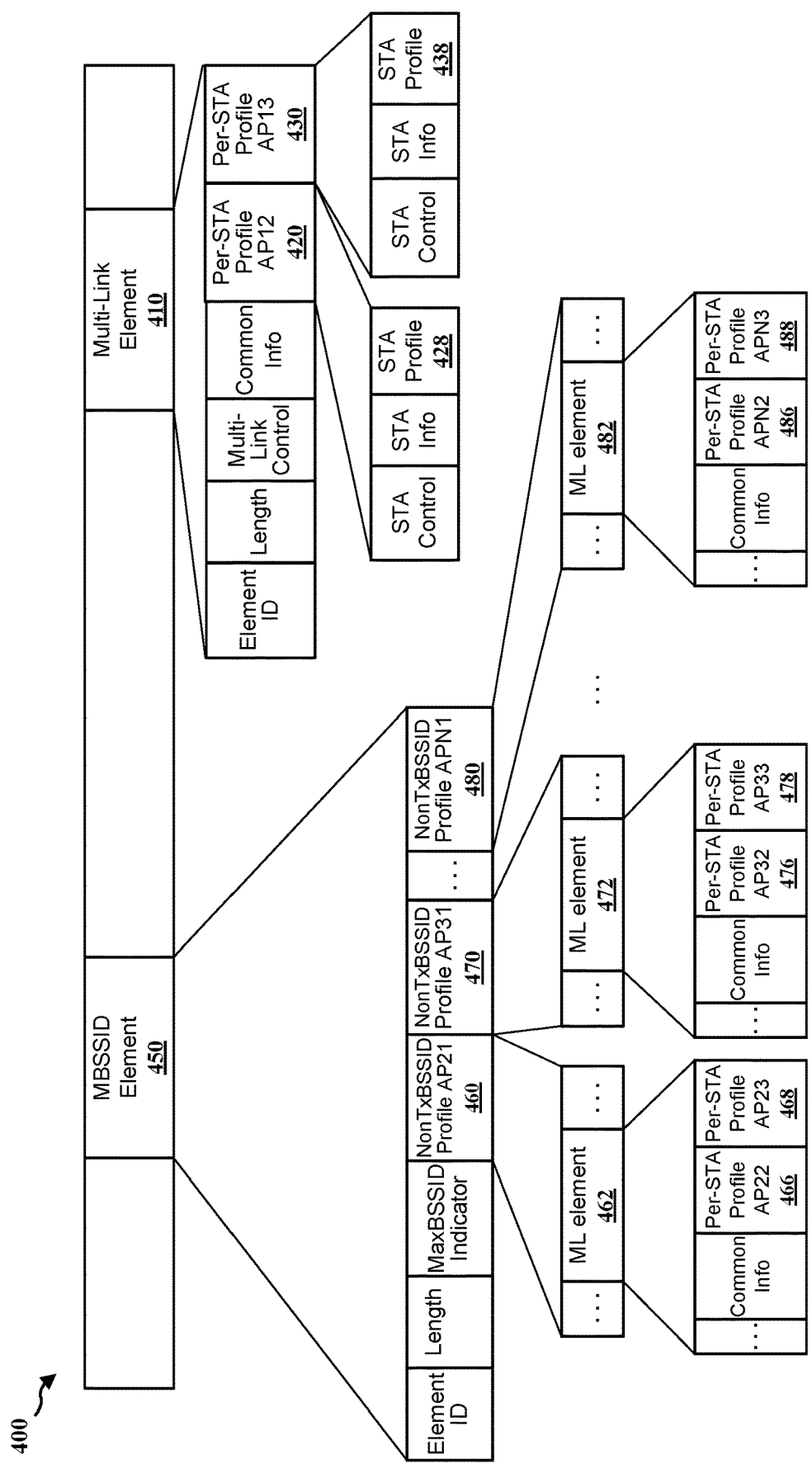
FIG. 4 is a network management frame of a method of wireless communication.

FIG. 4 is a network management frame 400 of a method of wireless communication. The network management frame 400 may include an ML element 410, which includes an AP12 STA profile 420 and an AP13 STA profile 430, an MBSSID element 450, which includes non-TxBSSID profiles of AP21 460, AP31 470, . . . , and APN1 480, and an ML element within each of the non-TxBSSID profiles of AP21 460, AP31 470, . . . , and APN1 480, which includes an AP22 STA profile 466, an AP23 STA profile 468, an AP32 STA profile 476, an AP33 STA profile 478, . . . , an APN2 STA profile 486, and an APN3 STA profile 488. Here, the network management frame 400 may be a beacon frame or a probe response frame.

In one aspect, the network management frame 400, i.e., the core frame, transmitted by the AP11 may include the MLO information of the AP11 as well as the ML element 410 that carries the AP12 STA profile 420 including the STA profile 428 for the AP12 and AP13 STA profile 430 including the STA profile 438 for the AP13. If at least one element in the core frame associated with the AP11 is applicable for the AP12 and the AP13, the at least one sub-element may be omitted in the ML element 410, and the at least one element from the network management frame 400 may be copied or applied to the AP12 STA profile 420 including the STA profile 428 for the AP12 and AP13 STA profile 430 including the STA profile 438 for the AP13. For example, if the PWD element from the network management frame 400 may be applicable to the AP12 and the AP13, the PWD element may be omitted in the per-STA profile of the ML element, and the PWD element may be inherited from the core frame. This procedure may be referred to as the inheritance in the ML element.

In another aspect, the network management frame 400 transmitted by the AP11 may include at least one non-TxBSSID profile of the non-TxBSSIDs, e.g., the AP21, the AP31, . . . the APN1 that are in the MBSSID set 450 on the same link as the TxBSSID, e.g., AP11. That is, the MBSSID element 450 may include an AP21 Non-TxBSSID profile 460, an AP31 Non-TxBSSID profile 470, or an APN1 Non-TxBSSID profile 480. Each of the at least one MBSSID element may include ML elements of corresponding MBSSIDs on the same MLD as each of the non-TxBSSIDs, e.g., the AP22, the AP23, . . . the APN2, and the APN3. That is, the AP21 Non-TxBSSID profile 460 may include the ML element 462 of the second MLD (refer to the second MLD 354 of FIG. 3B) including the AP22 STA profile 466 and the AP23 STA profile 468. The AP31 Non-TxBSSID profile 470 may include the ML element 472 of the third MLD including the AP32 STA profile 476 and the AP33 STA profile 478. The APN1 Non-TxBSSID profile 480 may include the ML element 482 of the Nth MLD (refer to the Nth MLD 356 of FIG. 3B) including the APN2 STA profile 486 and the APN3 STA profile 488. If at least one element in the core frame associated with the AP11 is applicable for the non-TxBSSIDs, e.g., the AP21, the AP32, . . . the APN1, the at least one element may be omitted, and the at least one element from the network management frame 400 may be copied or applied to the non-TxBSSIDs, e.g., the AP21, the AP32, . . . the APN1. This procedure may be referred to as the inheritance in the BSSID.

Accordingly, the inheritance mechanisms may be defined across the link on which the reporting AP operates or the MLD with which the reporting AP is affiliated. For example, the information may be inherited from the reporting AP, e.g., the AP11 to a reported AP, e.g., an AP12 or AP2. However, the inheritance mechanism of the MLO and the BSSID may not provide support for inheritance from one reported AP, e.g., the AP12, to other reported APs, e.g., AP22, . . . , APN2, when AP11 is the Tx AP.

In some aspects, the Tx AP may be configured to designate a parent ML IE and at least one child ML IE in the network management frame, e.g., the beacon frame or probe response frame, and the non-AP MLD may be configured to receive the network management frame and apply at least one part of the parent ML IE to the child ML IE.

Beacon frames may be prone to beacon bloating since they are broadcast frames for all STAs including the STAs that do not support the MLO. However, current disclosure is not limited thereto, and the parent ML IE and the at least one child ML IE may be applied to any network management frames as long as long as multiple ML IEs are present in the same frame. In one aspect, for the beacon frame and the probe response frame, the parent ML IE may be in the core frame, and the child ML IE may be in the MBSSID element. In another aspect, the multiple ML IEs may be at the same level, e.g., all ML IEs may be included in the core frame, and the parent ML IE may be one of the ML IEs in the core frame, and rest of the ML IEs may be the child ML IE. In another aspect, the multiple ML IEs may be included as sub-elements within an element.

In one aspect, the designation of parent IE may be implicit. That is, when the network management frame includes one ML element and at least one MBSSID element, the one ML element may implicitly be the parent ML element and the at least one MBSSID element may implicitly be the at least one child ML element.

In another aspect, the parent ML element may include an indicator, e.g., a parent indicator, to explicitly indicate that the corresponding ML element in the core frame is the parent ML element. In one example, an MLD ID subfield may be included to indicate whether the corresponding ML element is a parent ML element. That is, a subfield MLD ID in the ML IE may be provided to indicate whether the corresponding ML element is the parent ML element. For example, a MLD ID subfield value equal to 0 (MLD ID=0) in an ML IE may indicate that the corresponding ML element is the parent ML element. In another aspect, the subfield MLD ID in the ML IE may also indicate whether the corresponding ML element is the child ML element. For example, the ML elements with an MLD ID not equal to 0 (MLD ID !=0) may indicate that the corresponding ML elements are the at least one child element. In another aspect, the child ML element may not include any MLD ID subfield. That is, the lack of MLD ID may indicate that the corresponding ML element is the child ML element.

In response to establishing the relationship between the parent ML element and the child ML elements, at least a part of the parent ML element may be duplicated/inherited to the child ML element. The AP MLD may generate the network management frame, based on the designated parent ML element and child ML elements, to instruct or indicate the non-AP MLD to duplicate or inherit at least a part of the parent ML element to the child ML elements. The non-AP MLD may receive the network management frame from the AP MLD, identify the parent ML element and the child ML elements, and duplicate or inherit at least a part of the parent ML element to the child ML elements based on the instruction or indication from the AP MLD.

In one aspect, the sub-element of the ML element to be applied to the child elements may include at least one STA profile during network configuration updates. In some examples, various updates may affect all or a great number of VAPs in the MBSSID set operating on the same link. In one example, when a channel switch occurs, the channel may change for every VAP/BSSID in the MBSSID set on the corresponding link. In another aspect, in channel quieting, a same parameter may be applied for all MBSSIDs, e.g., quiet all BSSIDs in the MBSSID set for detecting radars. The network management frame for the network configuration update procedure may include similar updates to be applied to the MBSSID set operating on the same link. For example, updating to a static puncturing pattern due to detection of a new incumbent may include applying similar STA profile to each of the BSSID.

For example, in some network update procedures, the network management frame, e.g., the beacon and probe response frame, may include the same information for every ML element, but the inheritance in the MLO and the inheritance in the BSSID may not support application of inheritance across the per-STA profiles included in different ML elements in the same frame. Accordingly, if there are N VAPs in each MBSSID set, (N−1) duplications of the same information of the per-STA profiles may be added in the network management frame. For example, in a case of commercial MBSSID network with 16 VAPs, the network management frame may include 15 duplicates of the same information of the per-STA profiles, which may cause increased overhead and frame bloating.

In one example, for channel switching, up to 27 octets per BSSID, i.e., eCSA IE (6 octet)+maximum channel switch time ID (Max Ch Sw Time IE) (6 octet)+channel switch wrapper IE (Ch Sw Wrapper IE) (15 octet) may include duplicate information, and therefore, for 16 VAPs, up to 405 octets of duplicate information may be duplicated for 15 non-TxBSSIDs in the network management frame. In another example, for channel quieting, up to 11 octets per BSSID, i.e., Quiet IE (8 octets)+Quiet Channel IE (3 octets) may include duplicate information, and therefore, for 16 VAPs, up to 165 octets of duplicate information may be duplicated for 15 non-TxBSSIDs in the network management frame. In another example, for puncturing pattern update, 16 octets per BSSID (Channel Switch Wrapper element) may include duplicate information, and therefore, 225 octets of duplicate information may be duplicated for the 16 VAPs. For a 2.4 GHz beacon frame at 1 Mbps of speed, the transmission of the network management frame may correspond to 1.3-3.24 milliseconds of time used for the transmission of the bloated network management frame.

Figure 5:
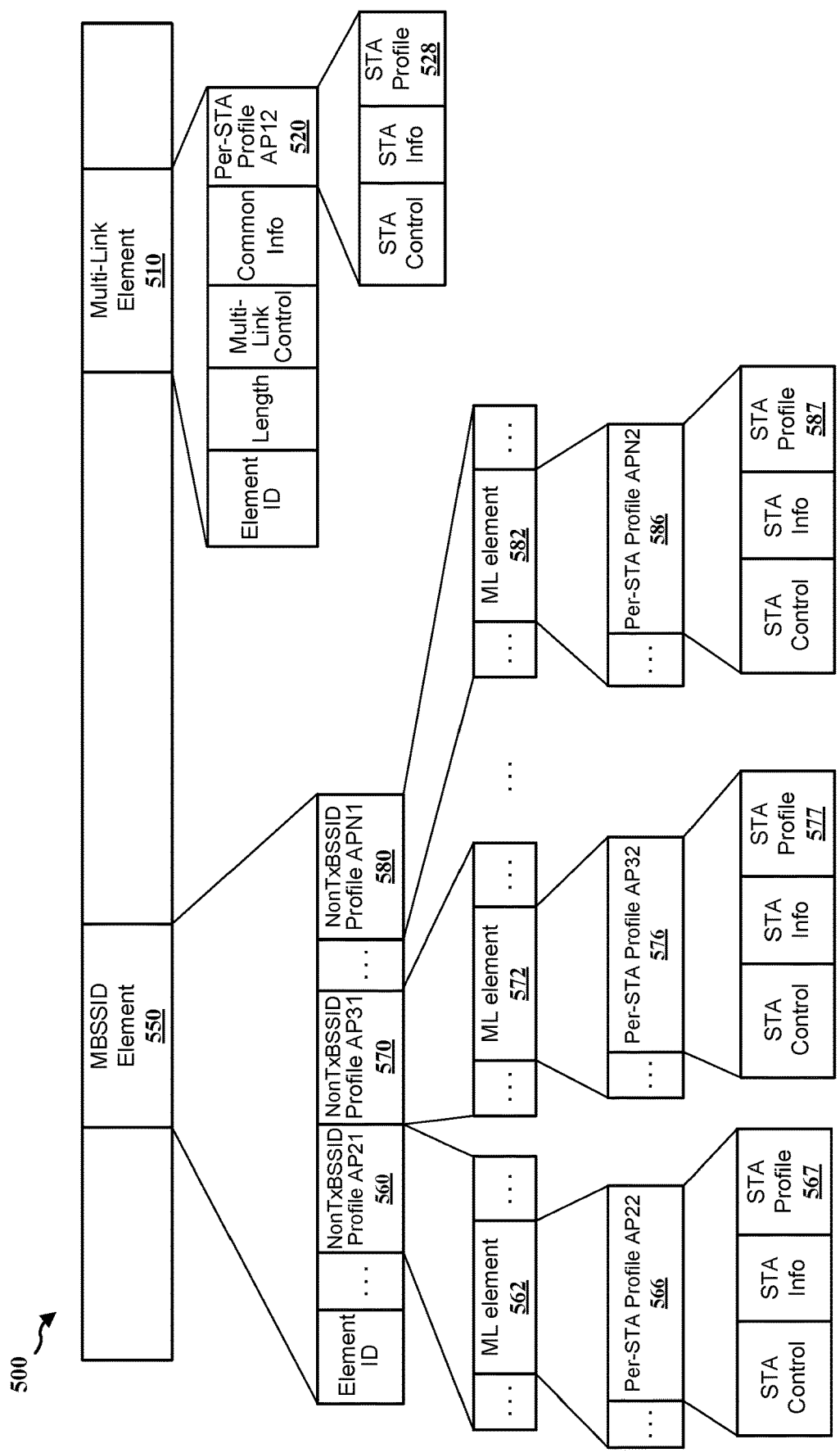
FIG. 5 is a network management frame of a method of wireless communication.

FIG. 5 is a network management frame 500 of a method of wireless communication. The network management frame 500 may include an ML element 510, which includes an AP12 STA profile 520, an MBSSID element 550, which includes non-TxBSSID profiles of AP21 560, AP31 570, . . . , and APN1 580, and an ML element within each of the non-TxBSSID profiles of AP21 560, AP31 570, . . . , and APN1 580, which includes an AP22 STA profile 566, an AP32 STA profile 576, . . . , and an APN2 STA profile 586. The AP21 Non-TxBSSID profile 560 may include the ML element 562 of the second MLD (refer to the second MLD 354 of FIG. 3B) including the AP22 STA profile 566. The AP31 Non-TxBSSID profile 570 may include the ML element 572 of the third MLD including the AP32 STA profile 576. The APN1 Non-TxBSSID profile 580 may include the ML element 582 of the Nth MLD (refer to the Nth MLD 356 of FIG. 3B) including the APN2 STA profile 586.

Here, the network management frame 500 may be a beacon frame provided for channel switching procedure. For example, the STA profile 528 of the AP12 STA profile 520 may include the eCSA IE, the MCST IE, and the CSW IE, which may include up to 27 octets. The same information of the STA profile 528 of the AP12 STA profile 520 may be applicable or included to the STA profile 567 of the AP22 STA profile 566, the STA profile 577 of the AP32 STA profile 576, and the STA profile 587 of the APN2 STA profile 586.

In some aspects, the Tx AP MLD may designate the ML element 510 as the parent ML element and ML elements 562, 572, and 582 of the MBSSID element 550 as the child ML elements. Here, the designation may be implicit or explicit. In one aspect, the Tx AP MLD may implicitly designate the ML element 510 as the parent ML element by including no other ML element other than the ML element 510 in the core frame. In another aspect, the Tx AP MLD may explicitly designate the ML element 510 as the parent ML element by including an MLD ID subfield with value=0 to indicating that the ML element 510 is the parent ML element.

Based on the designation of the parent ML element and the child ML elements, the Tx AP MLD may generate the network management frame to omit the STA profile in the child ML elements and indicate the non-AP MLDs to apply the corresponding STA profile from the parent ML element to the child ML elements. That is, based on designating the ML element 510 as the parent ML element and the ML elements 562, 572, and 582 of the MBSSID element 550 as the child ML elements, the Tx AP MLD may generate the network management frame 500 by omitting the duplicate information in the STA profiles 567, 577, and 587 in the child ML elements 562, 572, and 582 of the MBSSID element 550. The Tx AP MLD may indicate or instruct the non-AP MLD to apply the STA profile 528 of the parent MLD element 510 in the core frame to the child ML elements 562, 572, and 582 of the MBSSID element 550. The non-AP MLD may receive the network management frame 500, identify that the ML element 510 is designated as the parent ML element and the ML elements 562, 572, and 582 of the MBSSID element 550 are designated as the child ML elements, and apply or duplicate the information of the STA profile 528 of the parent MLD element 510 in the core frame to the child ML elements 562, 572, and 582 of the MBSSID element 550 based on the instruction or indication from the Tx AP MLD.

In one aspect, the non-AP MLD may infer the instruction or indication to apply or duplicate the information of the parent ML element to the child ML element from the network management frame 500. That is, the Tx AP MLD and the non-AP MLD may have an agreement to apply or duplicate the information of the parent ML element to the child ML element based on a type of the network management frame 500. For example, a network management frame of a network configuration updates that may affect all or most of the BSSIDs on a link, e.g., channel switching or channel quieting, may indicate the non-AP MLD to apply or duplicate the information of the parent ML element to the child ML element. Here, the non-AP MLD has enough information during the discovery and association procedure to determine which AP may operate on which link. Accordingly, the non-AP MLDs may infer that if the network configuration update occurred for one VAP on a link, then the network configuration update may occur for all VAPs operating on the corresponding link. For example, if a CSA was included for one VAP, the non-AP MLD may understand that same CSA IE may be applied for all the VAPs on the link of the one VAP. The list of network update procedures that instructs the non-AP MLD to apply the parent ML element to the child ML elements may be categorized or stored for the AP MLDs and the non-AP MLDs. For example, updating the static puncturing pattern may be included as a part of the category of the network procedures that instructs the application parent ML element.

Figure 6:
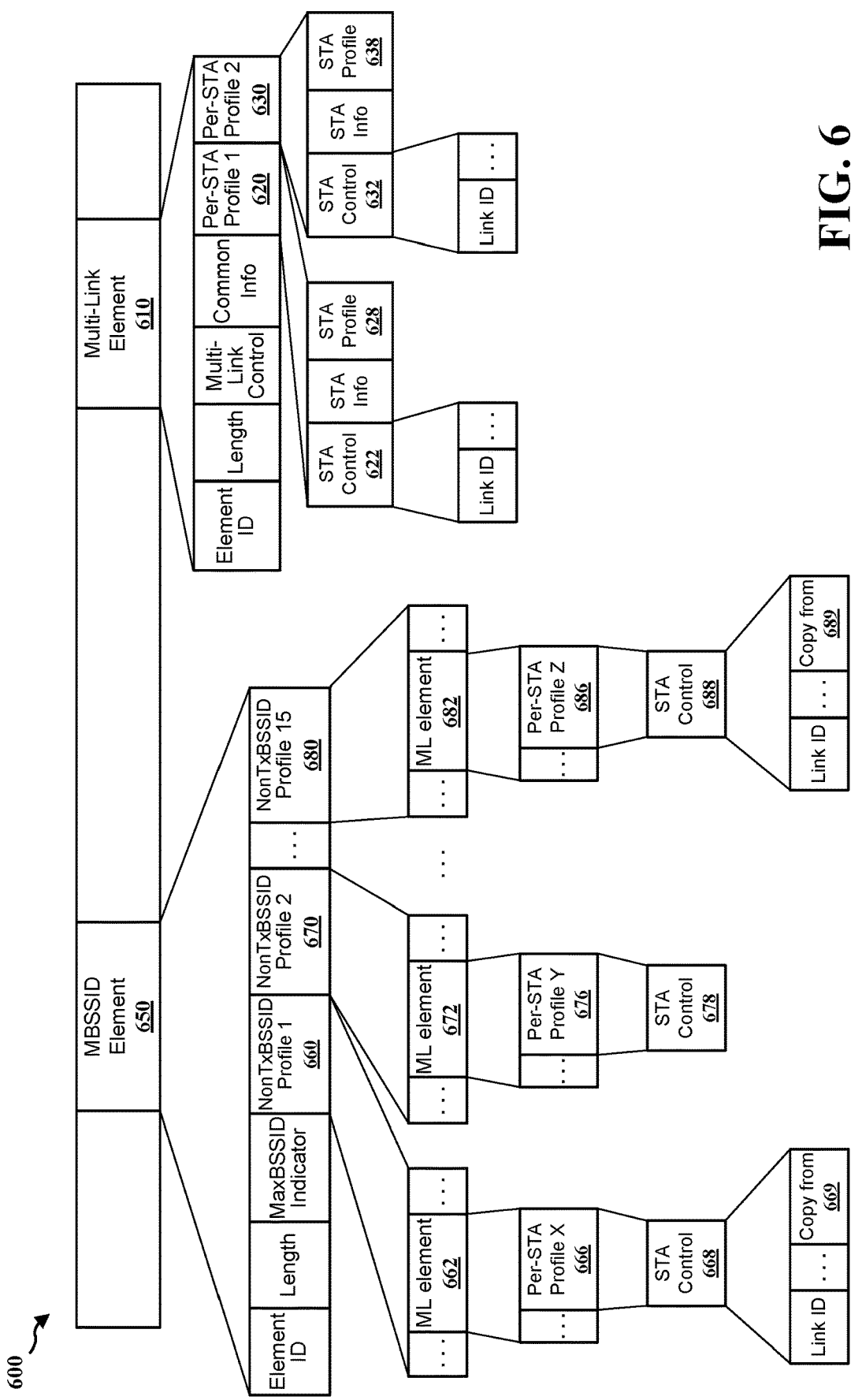
FIG. 6 is a network management frame of a method of wireless communication.

FIG. 6 is a network management frame 600 of a method of wireless communication. The network management frame 600 may include an ML element 610 which includes a Per-STA profile 1 620 and a Per-STA profile 630, an MBSSID element 650 which includes non-TxBSSID profile 1 660, non-TxBSSID profile 2 670, . . . , and non-TxBSSID profile 15 680, and an ML element within each of the non-TxBSSID profile 1, the non-TxBSSID profile 2, . . . , and the non-TxBSSID profile 15, which includes a Per-STA profile X 666, a Per-STA profile Y 676, . . . , and a Per-STA profile Z 686. The Non-TxBSSID profile 1 660 may include the ML element 662 of the second MLD (refer to the second MLD 354 of FIG. 3B) including the Per-STA profile X 666. The Non-TxBSSID profile 2 670 may include the ML element 672 of the third MLD including the Per-STA profile Y 676, and the and the Per-STA profile Y 676 may include a STA control field 678. The Non-TxBSSID profile 15 680 may include the ML element 682 of the 16$^{th}$ MLD (refer to the Nth MLD 356 of FIG. 3B, where N is 16) including the Per-STA profile Z 686.

In some aspects, the indication to apply or duplicate the information of the parent ML element to the child ML element may be included in the STA control field of the child ML element. For example, the AP MLD may use four reserved bits in the STA control field to indicate the Link ID of the Per-STA profile sub-element of the parent ML IE whose Per-STA profile subfield is to be copied to the child ML element. Here, the STA control field may include Link ID subfield and copy_from_subfield, where the link ID subfield may indicate the link to which the Per-STA profile may be copied or applied, and the copy_from_subfield may indicate which Per-STA profile to copy or apply from.

The Per-STA profile 1 620 of the ML element 610 may be associated with link 1, and the Per-STA profile 2 630 of the ML element 610 may be associated with link 2. Accordingly, the Link ID of the STA control field 622 may indicate the link 1 and the Link ID of the STA control field 632 may indicate the link 2.

In one example, the Per-STA profile X 666 may include a STA control field 668 including a link ID IE and a copy_from_subfield 669, and the Per-STA profile Z 686 may include a STA control field 688 including a link ID IE and a copy_from_subfield 689. Here, the link ID subfield of the STA control field 668 may indicate the non-AP MLD to apply the STA profile to link 1, and the copy_from_subfield 669 of the STA control field 668 may indicate the non-AP MLD to copy the STA profile 1 of the parent ML IE. Accordingly, based on the indication of the link ID subfield and the copy_from_subfield 669 of the STA control field 668, the non-AP MLD may copy the STA profile 628 of the Per-STA profile 1 620 of the parent ML element to the Per-STA profile X 666 of the child ML element.

In another example, the Per-STA profile Z 686 may include a STA control field 688 including a link ID subfield and a copy_from_subfield 689, and the Per-STA profile Z 686 may include a STA control field 688 including a link ID subfield and a copy_from_subfield 689. Here, the link ID subfield of the STA control field 688 may indicate the non-AP MLD to copy the STA profile from link 2, and the copy_from_subfield 689 of the STA control field 688 may indicate the non-AP MLD to copy the STA profile 2. Accordingly, based on the indication of the link ID subfield and the copy_from_subfield 689 of the STA control field 688, the non-AP MLD may copy the STA profile 638 of the Per-STA profile 2 630 of the parent ML element to the Per-STA profile Z 686 of the child ML element.

Accordingly, the STA control field of each of the child ML elements may include subfields, e.g., the link ID subfield and the copy_from_subfield, that may indicate which per-STA profile from the parent ML element to be copied to the corresponding Per-STA profile of the child ML elements. The Tx AP MLD may generate the network management frame 600 without including duplicate per-STA profiles in the child ML element, and may instruct the non-AP MLD to apply corresponding per-STA profiles from the parent ML element to the child ML element that shares the same per-STA profiles.

Figure 7:
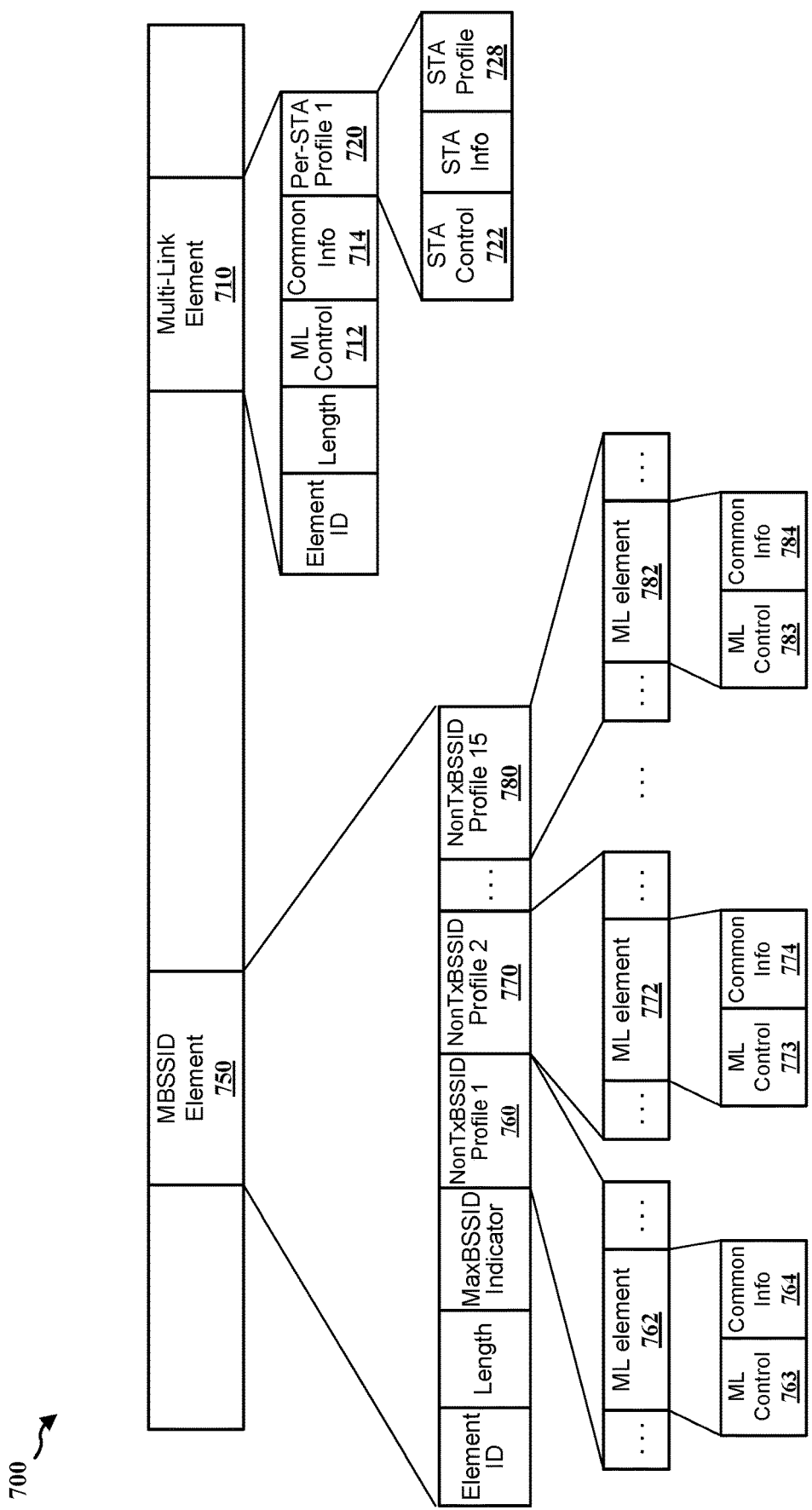
FIG. 7 is a network management frame of a method of wireless communication.

FIG. 7 is a network management frame 700 of a method of wireless communication. The network management frame 700 may include an ML element 710 including a Per-STA profile 1 720, an MBSSID element 750 including non-TxBSSID profile 1 760, non-TxBSSID profile 2 770, . . . , and non-TxBSSID profile 15 780, each including ML elements 762, 772, . . . , and 782. The ML element 762 of the non-TxBSSID profile 1 760 may include an ML control field 763 and a common information field 764, the ML element 772 of the non-TxBSSID profile 2 770 may include an ML control field 773 and a common information field 774, and the ML element 782 of the non-TxBSSID profile 15 780 may include an ML control field 783 and a common information field 784. The Per-STA profile 1 720 of the ML element 710, e.g., the parent ML element, may include a STA control field 722, STA information field, and a STA profile 728 field.

In some aspects, the indication to apply or duplicate the information of the parent ML element to the child ML element may be included in the ML control field or the common information field of the child ML element. In one aspect, the indication to apply or duplicate the information of the parent ML element to the child ML element may be included in the ML control field of the child ML element. That is, the Tx AP MLD may use a reserved bit or add a new indication in the presence bitmap subfield, which signals the types of information included the common information field. In one example, The ML control field 763 may include an indication, e.g., a bit value, whether the per-STA profile 1 720 including the STA profile 728 from the parent ML element, e.g., the ML element 710, is applied to the ML element 762. In another example, The ML control field 773 may include an indication, e.g., a bit value, whether the per-STA profile 1 720 including the STA profile 728 from the parent ML element, e.g., the ML element 710, is applied to the ML element 772. In another example, The ML control field 783 may include an indication, e.g., a bit value, whether the per-STA profile 1 720 including the STA profile 728 from the parent ML element, e.g., the ML element 710, is applied to the ML element 782.

In another aspect, the indication to apply or duplicate the information of the parent ML element to the child ML element may be included in the common information field of the child ML element. That is, the Tx AP MLD may use one of the reserved bits, e.g., in the link ID information subfield, of the common information field of the child ML element. In one example, the common information field 764 may include an indication, e.g., a bit value, whether the per-STA profile 1 720 including the STA profile 728 from the parent ML element, e.g., the ML element 710, is applied to the ML element 762. In another example, the common information field 774 may include an indication, e.g., a bit value, whether the per-STA profile 1 720 including the STA profile 728 from the parent ML element, e.g., the ML element 710, is applied to the ML element 772. In another example, the common information field 784 may include an indication, e.g., a bit value, whether the per-STA profile 1 720 including the STA profile 728 from the parent ML element, e.g., the ML element 710, is applied to the ML element 782.

By including the indication to apply or duplicate the information of the parent ML element to the child ML element may be included in the ML control field or the common information field of the child ML element, and the link information field may be absent of data, not including any overhead to the STA control field of the child ML elements. The indication included in the ML control field or the common information field of the child ML element may indicate whether to apply or duplicate the information of a single per-STA profile included in the parent ML element to the child ML element.

In some aspects, the indication may be included in the parent ML element to signal that the per-STA profile may be applied to all the child ML IEs in the network management frame that are applicable. That is, the indication to apply or duplicate the information of the parent ML element to all the child ML element may be provided in parent ML element may be included in one of the common information field, the Per-STA profile, or the ML Control field of the parent ML IE. In one aspect, the information of the parent ML element may be applied to the child ML element with omitted information fields. For example, at least one of the ML control field 712, the control information field 714, or the Per-STA profile 1 720 may include a one-bit indication to signal the indication to apply or duplicate the information of the parent ML element to all the child ML element, e.g., the ML elements 762, 772, . . . , 782.

Figure 8:
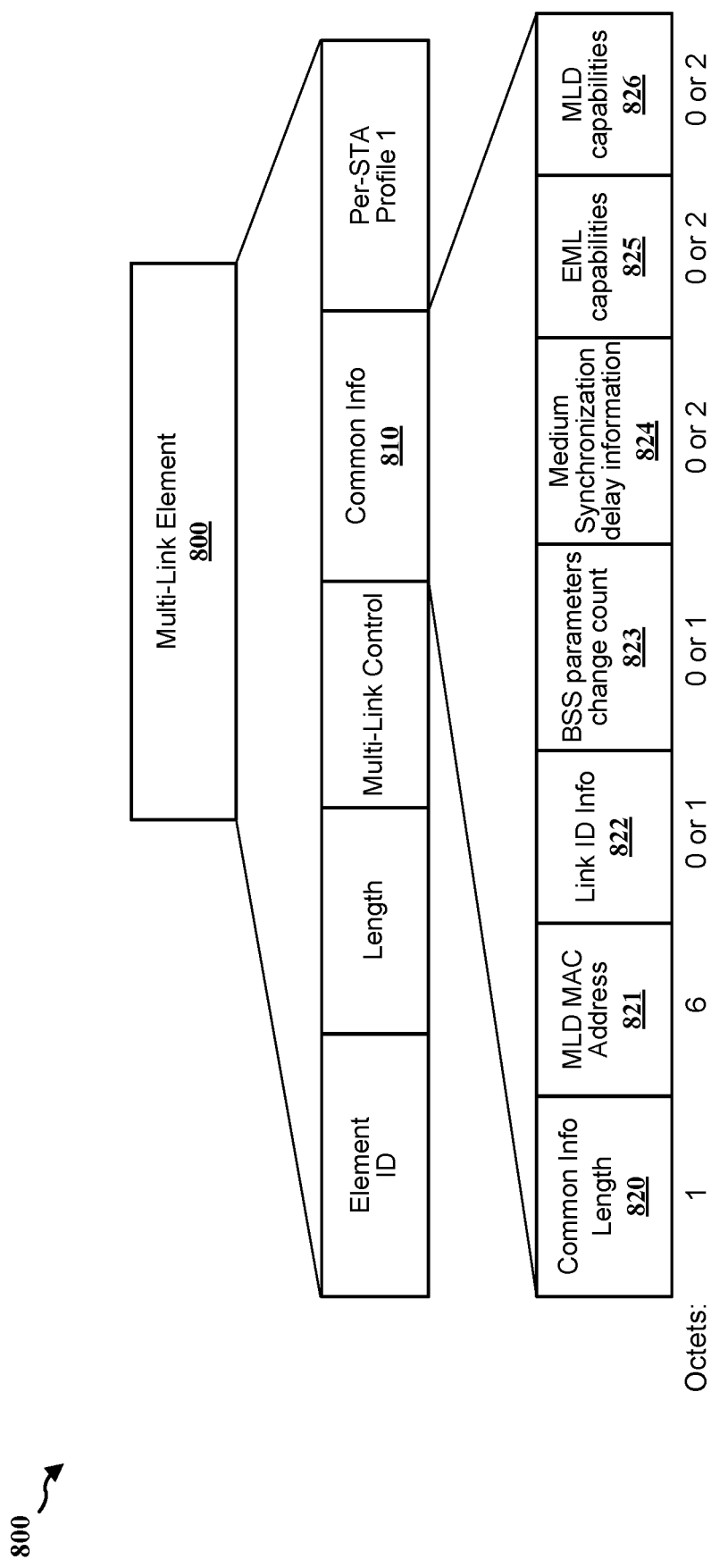
FIG. 8 is an ML element of a method of wireless communication.

FIG. 8 is an ML element 800 of a method of wireless communication. The ML element 800 may include a common information field 810, and the common information field 810 of the ML element 800 may carry the subfields that provide MLD level capabilities. That is, the common information field 810 may include a common information length subfield 820, an MLD MAC address subfield 821, a link ID information subfield 822, a basic service set (BSS) parameters change count subfield 823, a medium synchronization delay information subfield 824, an enhanced ML (eML) capabilities subfield 825, or an MLD capabilities subfield 826. Each information subfield of the common information field 810 may have different sizes. For example, the common information length subfield 820 may have 1 octet, the MLD MAC address subfield 821 may have 6 octets, the link ID information subfield 822 may have 0 or 1 octet, the BSS parameters change count subfield 823 may have 0 or 1 octet, the medium synchronization delay information subfield 824 may have 0 or 2 octets, the eML capabilities subfield 825 may have 0 or 2 octets, and the MLD capabilities subfield 826 may have 0 or 2 octets. Accordingly, the common information field 810 may have a total size of 7 octets to 13 octets.

In the network architecture with the MBSSID and MLO configurations, many of the above subfields may carry similar values for the TxBSSID and the non-TxBSSID, and if the child ML elements may apply the same value from the parent ML element, the overall size of the network management frame may be reduced. That is, since the common information field 810 of the ML element 800 carries the subfields that provide MLD level capabilities, the Tx BSSID and the non-TxBSSID may mostly share the same MLD level capabilities. For example, the link ID information subfield may carry the link ID of the link on which the ML element was transmitted, which means that the valued of the link ID may likely be the same for the non-TxBSSIDs. Furthermore, the TxBSSID and the non-TxBSSIDs are likely to have the same values for medium synchronization delay information subfield 824, e.g., threshold IE or MAX_TxOP IE, the eML capabilities subfield 825, or the MLD capabilities subfield 826. Accordingly, up to 7 octets may be duplicated in the common information field 810 of each non-TxBSSID. In another aspect, the MLD MAC address of the MLD affiliated with the non-TxBSSID may be derived in a manner similar to deriving the MAC address of the BSSIDs of the non-TxBSSIDs, which may reduce 6 more octets.

Accordingly, by applying the information of the common information field from the parent ML element to the child ML element, the Tx AP MLD may reduce up to 13 octets per non-TxBSSID. In case the network configuration includes 16 VAPs including one TxBSSID and 15 non-TxBSSIDs, total 195 octets, e.g., 15×13, may be reduced for the network management frame.

Figure 9:
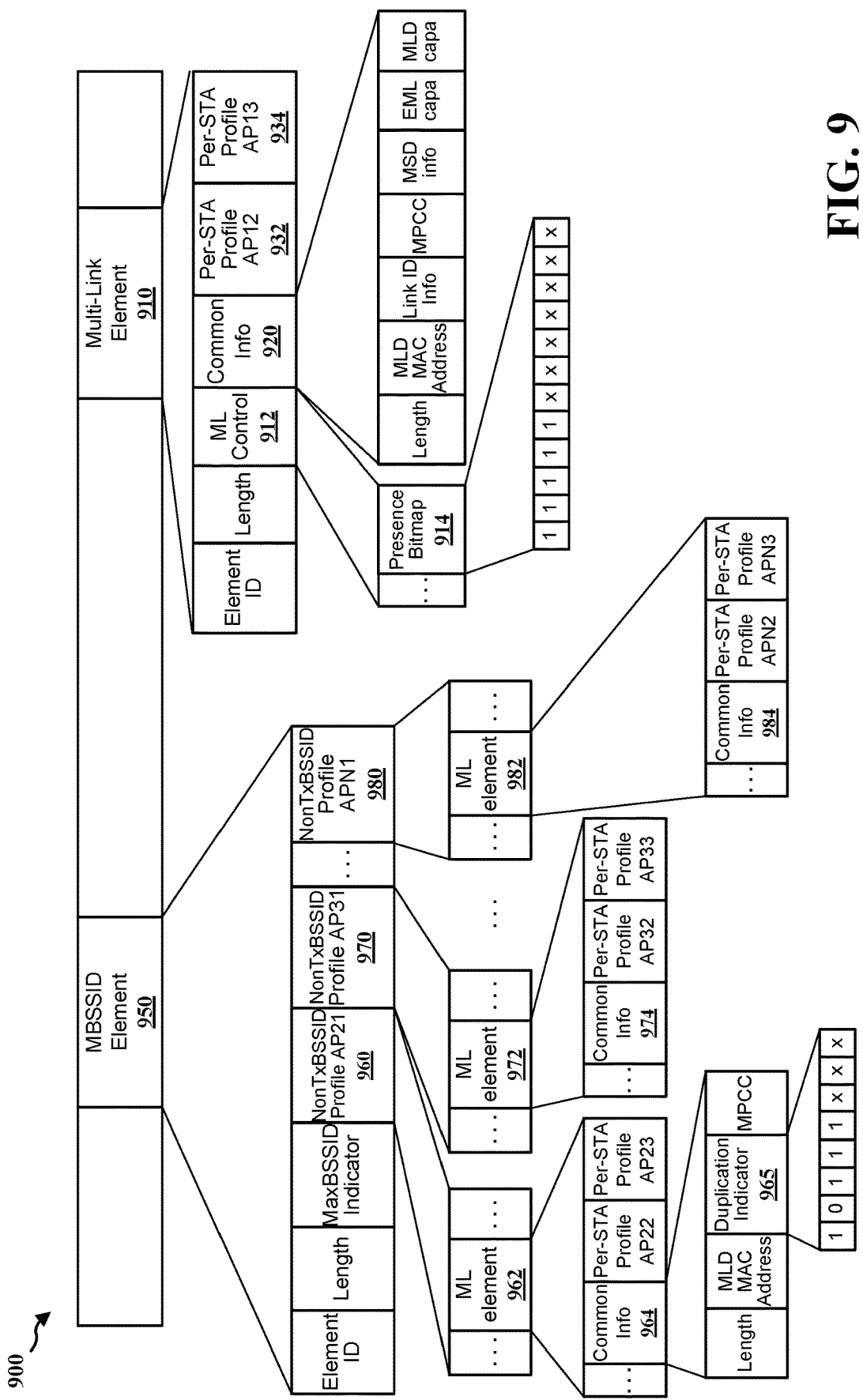
FIG. 9 is a network management frame of a method of wireless communication.

FIG. 9 is a network management frame 900 of a method of wireless communication. The network management frame 900 may include an ML element 910 including an ML control field 912, a common information field 920, an AP12 STA profile 932, and an AP13 STA profile 934, and an MBSSID element 950 including a non-TxBSSID profile AP21 960, a non-TxBSSID profile AP31 970, . . . , and a non-TxBSSID profile APN1 980, and an ML element within each of the non-TxBSSID profile AP21 960, the non-TxBSSID profile AP31 970, . . . , and the non-TxBSSID profile APN1 980. Each of the ML elements may include common information fields. That is, the ML element 962 of the Non-TxBSSID profile AP21 960 may include the common information field 964, the ML element 972 of the Non-TxBSSID profile AP31 970 may include the common information field 974, and the ML element 982 of the Non-TxBSSID profile APN1 980 may include the common information field 984.

The common information fields of the child ML elements may include a new subfield of indication to apply the corresponding subfield from the common information field 920 of the parent ML element 910. The ML element may include a presence bitmap field 914 in the ML control field, and the presence bitmap field 914 may indicate which subfields are present in the corresponding common information field 920. That is, the length subfield and the MLD MAC address subfield of the common information field 920 are mandatory field, and the presence bitmap field 914 of the ML control field 912 may indicate whether each of the link ID information subfield, the BSS parameters change count subfield, the medium synchronization delay information subfield, the eML capabilities subfield, or the MLD capabilities subfield are present in the common information field 920. Each bit value of the presence bitmap field 914 indicates whether the corresponding subfield is present in the common information field 920.

In a similar manner as the presence bitmap field 914 of the ML control field 912, the common information field 964 may include a duplication indicator subfield 965 after the length subfield and MLD MAC address subfield of the common information field 964 of the child ML element. The order of the subfields in the duplication indicator subfield 965 and the presence bitmap field 914 may be the same. That is, each bit of the duplication indicator subfield 965 and the presence bitmap field 914 may be associated with, in the order of, the Link ID Information subfield (i.e., Link ID Info subfield), the BPCC subfield, the MSD Information subfield (i.e., MSD Info subfield), the EML capabilities subfield, the MLD capabilities subfield, and 3 reserved subfields. For example, a bit set to 1 may indicate that the corresponding subfield is to be applied from the parent ML element, and a bit set to 0 may indicate not to apply the corresponding subfield from the parent ML element.

Here, each bit value of the duplication indicator subfield 965 may indicate whether the corresponding subfield is applied from the common information field 920 of the parent ML element. For example, the duplication indicator subfield 965 may have bit value of 10111, and accordingly, may indicate the non-AP MLD to apply the link ID information subfield, the MSD information subfield, the eML capabilities subfield, and the MLD capabilities subfield, and the BPCC for the child ML element 962 may be included in the common information field 964 of the child ML element 962.

The Tx AP MLD transmitting the beacon frame may decide whether to include the duplication indicator subfield or not. In some aspects, the decision to include the duplication indicator subfield may be based on how many subfields can be duplicated or applied from the parent ML element. That is, since adding a new subfield of the duplication indicator subfield may add a bit field of 8 bits to the common information field of all the child ML elements, the Tx AP MLD may determine to add the duplication indicator subfield when the newly added subfield may be justified. For example, if one or two subfields may be duplicated from the parent ML element to the child ML element, the Tx AP MLD may decide not to include the duplication indicator subfield.

In some aspects, the decision may also be based on whether the associated STAs may want to decode the parent ML IE from the core frame. That is, since the MBSSID element appears in the frame that is much ahead of the ML element, if non-AP MLD (or a client device) may decode the majority of the information from the MBSSID element (including the child ML element) without having to remain awake and decode the ML IE, e.g., the parent ML element, the AP may choose to provide duplicate information to the corresponding non-AP MLD to conserve power.

In another aspect, when multiple ML element are included in the same frame and the Per-STA profile is present in more than one ML element, the contents of the STA information field of the Per-STA profiles may be identical. Accordingly, a duplication indicator subfield in the STA information field may signal which subfield in the STA information field of the parent ML element may be applied to the child ML elements. That is, at least a part of the STA information of the parent ML element indicated by the duplication indicator subfield in the STA information field may be applied to the child ML element based on the duplication indicator subfield of the STA information field.

Figure 10:
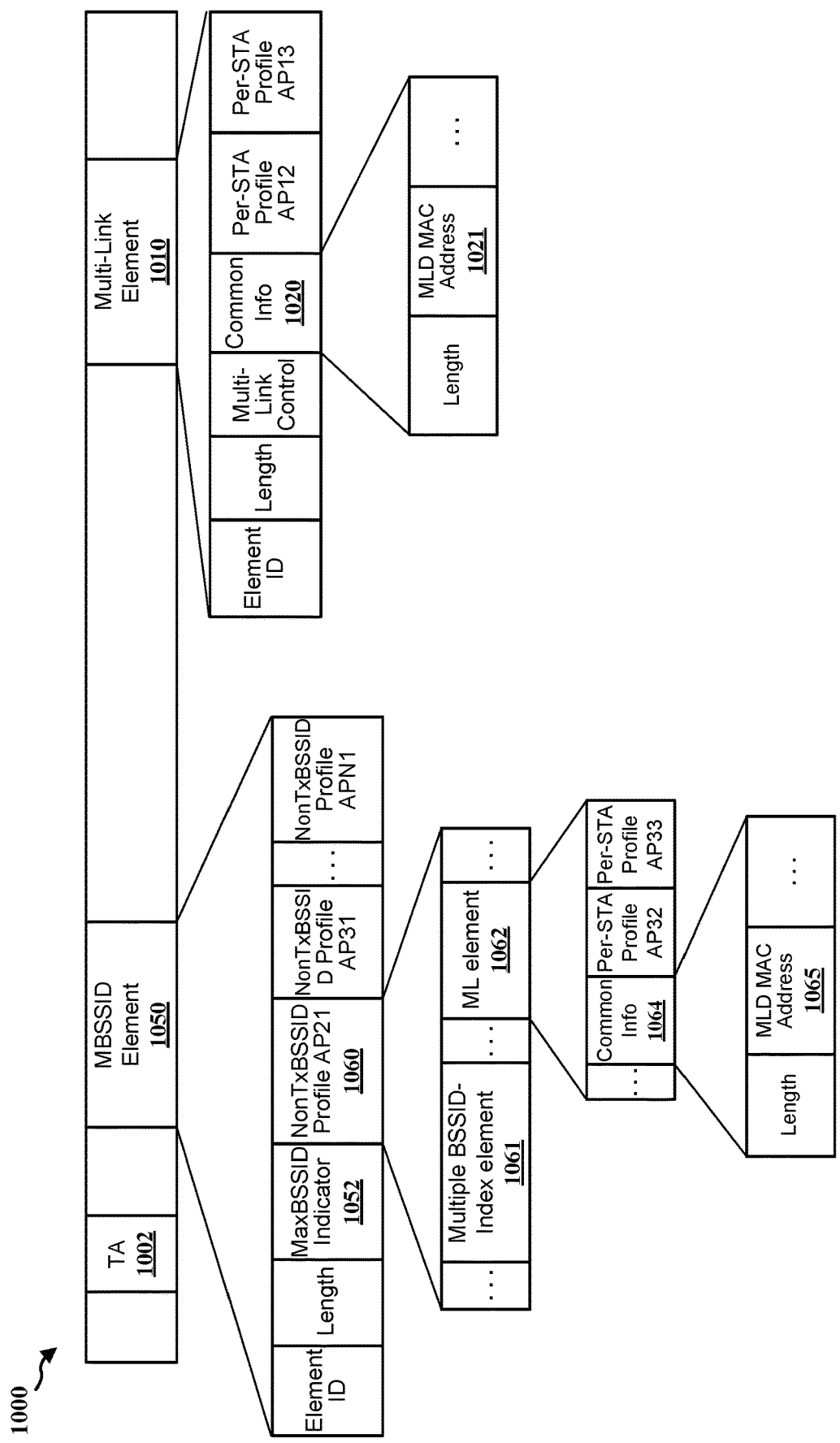
FIG. 10 is a network management frame of a method of wireless communication.

FIG. 10 is a network management frame 1000 of a method of wireless communication. The network management frame 1000 may include a transmitter address (TA) 1002 including a reference MAC address of the Tx-AP MLD, e.g., the AP11, an ML element 1010 including a common information field 1020 including an MLD MAC address 1021, and an MBSSID element 1050 including a MaxBSSID indicator field 1052 and a non-TxBSSID profile AP21 1060, a non-TxBSSID profile AP31, . . . , and a non-TxBSSID profile APN1. Each of the non-TxBSSID profile may include an MBSSID index element 1061 and an ML element 1062, e.g., the child ML element. The ML element 1062 may include a common information field 1064, and the common information field 1064 may include an MLD MAC address subfield 1065.

In some aspects, the MLD MAC address of the MLD affiliated with the non-TxBSSID may be derived in a manner similar to deriving the MAC address of the BSSIDs of the non-TxBSSIDs, which may reduce 6 more octets. In one aspect, the Tx AP MLD may designate one MLD as the reference MLD, and configure the common information field of the child ML element to not include the MLD MAC address subfield. Accordingly, the non-AP MLD may derive the MLD MAC address of the non-TxBSSIDs based on the reference MAC address of the reference MLD.

In one aspect, the Tx AP MLD may designate one MLD as the reference MLD, and the MLD MAC address of the reference MLD may be the reference MLD MAC address. Accordingly, the MLD MAC address of other MLDs may be derived from the reference MLD MAC address.

In another aspect, to support the application/derivation of the MLD MAC address of non-TxBSSIDs based on the reference MLD MAC address, the common information field may be configured not to include the MLD MAC address subfield. The TxBSSID may or may not include the MLD MAC address in the child ML element included in MBSSID element.

In a multiple BSSID element, the MAC address of the non-TxBSSID may be derived based on the reference MLD MAC address. For example, the reference MLD MAC address may be A0-A1-A2-A3-A4-A5. The non-TxBSSID MLD MAC address (i) may be defined as A0-A1-A2-A3-A4-A5(i), where the A5(i) may be defined as A5(i)=A5−B+ ((B+i)mod $2^n$), where B is defined as B=A5 mod $2^n$, and n refers to the maximum number of BSSID from the MaxBSSID indicator field 1052, and i refers to the MBSSID index from the MBSSID index element 1061, which is equal to the MLD ID of the MLD. That is, the non-AP MLD may apply the MLD MAC address subfield 1065 based on the reference MLD MAC address, the MaxBSSID indicator field 1052, and the MBSSID index element 1061. The same value of 'i' may be used to derive the MAC address of the non-TxBSSID and the MLD MAC address of the MLD with which the non-TxBSSID is affiliated, assuming that the TxBSSID is affiliated with the reference MLD.

In one aspect, the MBSSID sets may be configured on different links, and the TxBSSID on their respective links may be affiliated with the same AP MLD. For example, AP11 may be the TxBSSID on link 1, AP12 may be the TxBSSID on link 2, and the AP13 may be the TxBSSID on link 3. (refer back to FIG. 3B). Accordingly, the TxBSSID on the link 1, the link 2, and the link 3 may be on the same MLD, and accordingly, the reference MLD MAC address may be the same on each link. If the reference MLD MAC address may not be applicable for at least one of the links, the TxBSSID may include the MLD MAC address in the ML element for the at least one of the links. In this case, there may be no overhead reduction.

Figure 11:
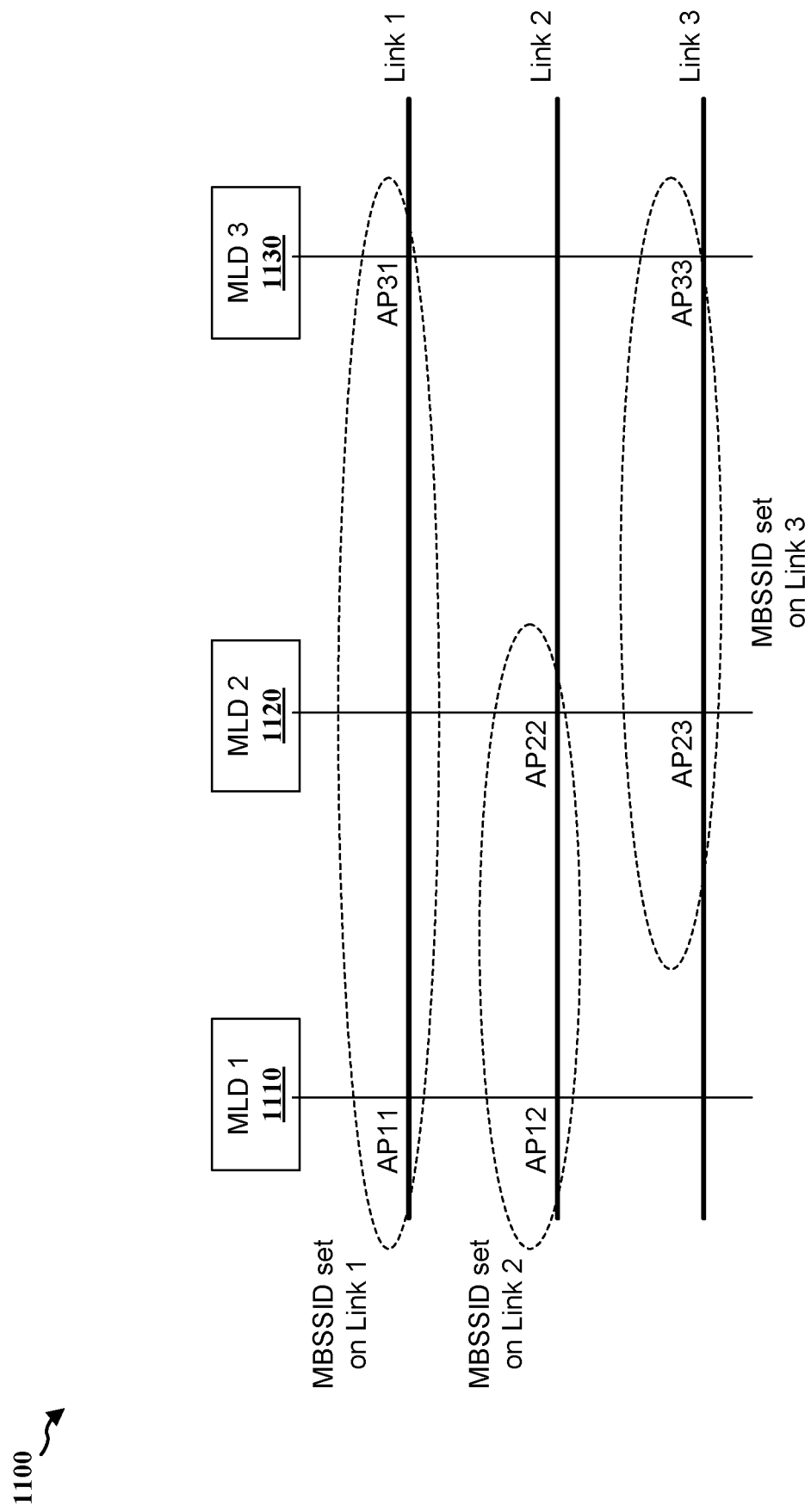
FIG. 11 is a wireless network including MLP and MBSSID.

FIG. 11 is a wireless network 1100 including MLO and MBSSID. The wireless network 1100 may include three links, link 1, link 2, and link 3. The link 1 may have a first MBSSID set (or a first set of APs) including AP11 and AP31, the link 2 may have a second MBSSID set (or a second set of APs) including AP12 and AP22, and the link 3 may have a third MBSSID set (or a third set of APs) including AP23 and AP33. That is, the wireless network 1100 shows that no MLD of the MLDs have an AP operating on all of the three links. That is, the first MLD 1110 does not have an AP operating on the link 3, the second MLD 1120 does not have an AP operating on the link 1, and the third MLD 1130 does not have an AP operating on the link 2. Accordingly, no one reference MLD may cover all of the MBSSIDs provided in the wireless network 1100.

For example, the first MLD 1110 may be defined as a reference MLD, and the reference MLD MAC address may be defined as the MLD MAC address of the first MLD 1110. Accordingly, on the link 1 and the link 2, AP11 and AP12 may be the TxBSSID. Based on the MLD MAC address of the first MLD 1110 may be used to compute the MLD MAC address of the second MLD 1120 and the third MLD 1130. Accordingly, 6 octets may be saved in the common information field of each child ML IE by computing the MLD MAC address of the second MLD 1120 and the third MLD 1130.

On the other hand, the MLD MAC address of the first MLD 1110 may not be used as the reference MLD MAC address for the third link since the first MLD 1110 may not include an AP on the third link. In response, one of the AP23 or the AP33 on link 3, may be assigned as the TxBSSID. In such cases, the MLD MAC address may not be derived, and no saving of octets may be performed on the MLD MAC address in this case. In such case, the network management frame may provide the MLD MAC address separately for the second MLD 1120 and the third MLD 1130.

Figure 12:
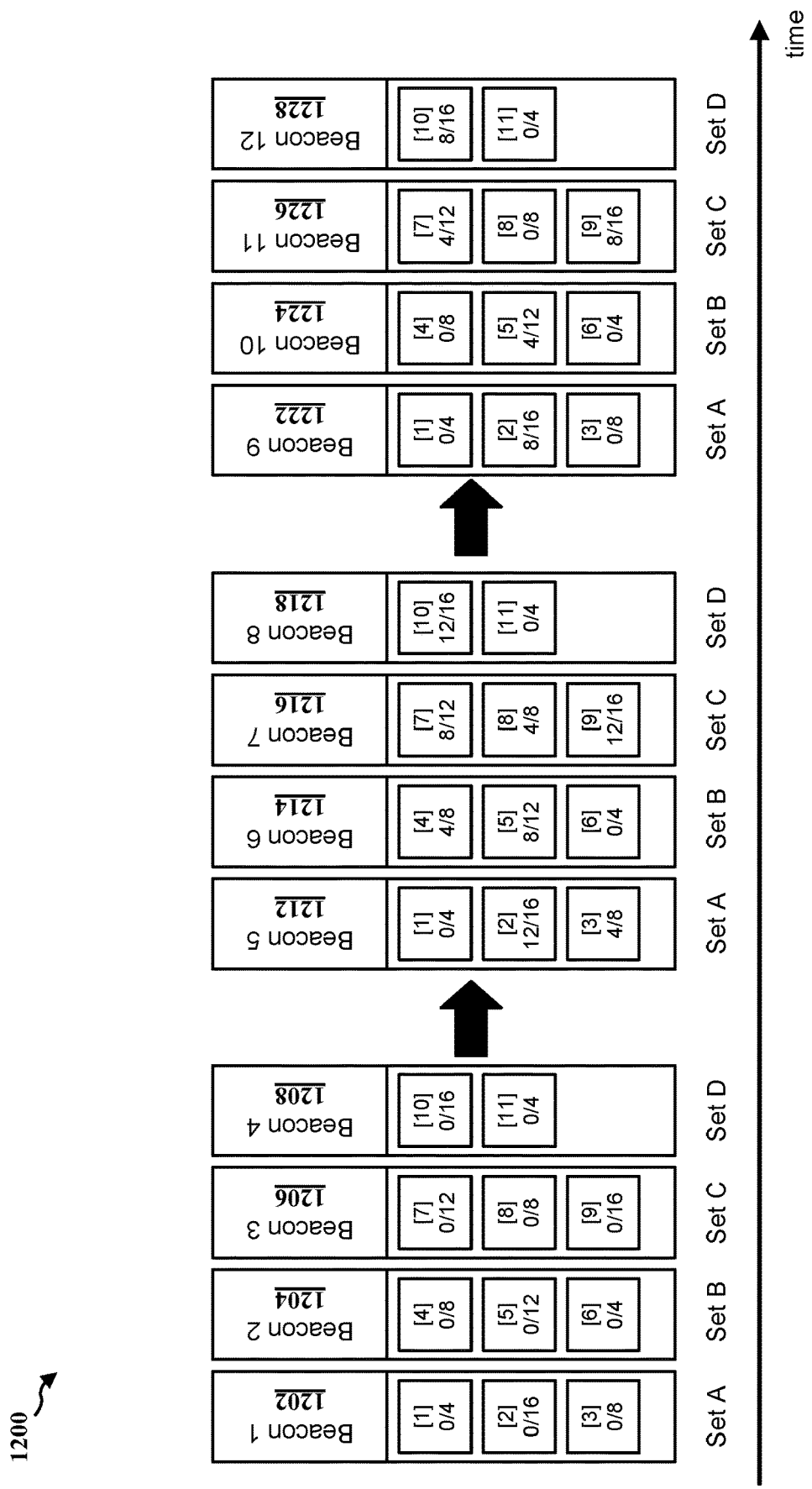
FIG. 12 is an enhanced MBSSID advertisement (EMA) of a method of wireless communication.

FIG. 12 is an enhanced MBSSID advertisement (EMA) 1200 of a method of wireless communication. According to the EMA 1200, the TxBSSID may broadcast a network management frame, e.g., beacon frame, and instead of carrying the Non-TxBSSID profiles of all non-Tx VAPs in the same Beacon, the EMA may allow the VAP to advertise a partial set of profile in each Beacon. Accordingly, all VAPs may be announced over a span of time called profile periodicity. Here, the number of non-transmitted VAPs may be 11, the profile of periodicity may be 4, a number of non-Tx profiles in one beacon may be 3. The EMA may be configured to allow APs to efficiently advertise the MBSSID information when there are a large number of VAPs in the MBSSID set (e.g., 16 VAPs).

In one aspect, the beacon frame 1202, beacon frame 1212, and beacon frame 1222 may include MBSSID information of VAP1, VAP2, and VAP3. The DTIM Beacon VAP1 may be transmitted once every 4 beacon frames, the DTIM Beacon of VAP2 may be transmitted once every 16 beacon frames, and the DTIM Beacon of VAP3 may be transmitted once every 4 beacon frames. The beacon frame 1204, beacon frame 1214, and beacon frame 1224 may include MBSSID information of VAP4, VAP5, and VAP6. The DTIM Beacon of VAP4 may be transmitted once every 8 beacon frames, the DTIM Beacon of VAP5 may be transmitted once every 12 beacon frames, and the DTIM Beacon of VAP6 may be transmitted once every 4 beacon frames. The beacon frame 1206, beacon frame 1216, and beacon frame 1226 may include MBSSID information of VAP7, VAP8, and VAP9. The DTIM Beacon of VAP7 may be transmitted once every 12 beacon frames, the DTIM Beacon of VAP8 may be transmitted once every 8 beacon frames, and the DTIM Beacon of VAP9 may be transmitted once every 16 beacon frames. The beacon frame 1208, beacon frame 1218, and beacon frame 1228 may include MBSSID information of VAP10 and VAP11. The DTIM Beacon of VAP10 may be transmitted once every 16 beacon frames, and the DTIM Beacon of VAP11 may be transmitted once every 4 beacon frames.

Accordingly, the STA may receive 11 non-TxBSSID profiles by receiving at least four (4) beacons. Here, the EMA may be used when carrying the MBSSID information of all non-Tx profiles causes the Beacon size to exceed a threshold. In one example, when a network configuration update occurs for a non-TxBSSID VAP11, the profile of the non-TxBSSID VAP11 may appear in the beacon frame 1208 (i.e., fourth beacon), the beacon frame 1218 (i.e., eighth beacon), and the beacon frame 1228 (i.e., twelfth beacon). That means, the associated STAs may wait for four beacons to receive the network update information for the VAP11. In another example, when a network configuration update occurs for a non-TxBSSID VAP7, the profile of the non-TxBSSID VAP7 may appear in the beacon frame 1206 (i.e., third beacon) and a seventh beacon. That is, the associated STAs may wake up every 12 beacons to receive the network update information for the VAP7.

Since the EMA may be used to carry or broadcast some of the MBSSID information, delay may be increased in various network configuration update procedures. For example, in case the TxBSSID instructs channel quieting for VAP11 a channel switching for the VAP11's partner VAP, e.g., the VAPs affiliated with the same AP MLD as the VAP11, the non-AP MLD (e.g., the STA associated with VAP11) may need to wait up to four beacon frames to receive the network configuration information for VAP11. Meanwhile, if the channel quieting or the channel switching occurs before the non-AP MLD properly receives the network configuration information for VAP11, the associated STA might transmit or communicate on the channel violating the regulatory rules.

In one aspect, the beacon frame may be configured to include non-TxBSSID profiles of all affected VAPs. That is, the TxBSSID may include, in the beacon frame, the non-TxBSSID profiles of all the VAPs that are affected by the network configuration update. Particularly, when a network configuration update may affect a subset of non-Tx VAPs, including all the non-TxBSSID profiles of all the VAPs affected by the network configuration update may reduce the delay of communicating the updated EMA configuration to the associated non-AP MLDs. However, the beacon frames may be configured to include profiles of the VAPs that are not scheduled for the VAPs, which may lead to beacon bloating. Therefore, this may not be suitable when a network configuration update affects all VAPs, e.g., channel switching.

In another aspect, the network configuration update may be configured to be announced to the affected VAPs early enough. In one example, the TxBSSID may be configured to transmit the network configuration update to the affected VAPs in at least one delivery traffic indication message (DTIM) beacon. Accordingly, the associated non-AP MLDs whose affiliated STAs wake up to receive Beacon frames at the DTIM Beacon may be configured to receive the updated network configuration before their DTIM Beacon. In another example, the TxBSSID may be configured to transmit the network configuration update to the affected VAPs in more than one DTIM beacon. This solution may also be applied for the AP that does not support the EMA. The TxBSSID may transmit the network configuration updates that are under the AP's control, such as channel quieting, in the DTIM beacon, and the network configuration updates that are not under AP's control, e.g., channel switching due to radar detection, may not be transmitted in the DTIM beacon. For example, when the regulatory rules configures the VAPs belonging to an MBSSID set on a link to switch the channel immediately, the TxBSSID may not have sufficient time to include the updated network configuration in the DTIM Beacon.

In another aspect, an indication may be included in the parent ML element to signal that the per-STA profile may be applied to all VAPs affected by the network configuration update. Accordingly, the beacon may include the non-TxBSSID profile in the beacon frame while reducing the beacon bloating.

Figure 13:
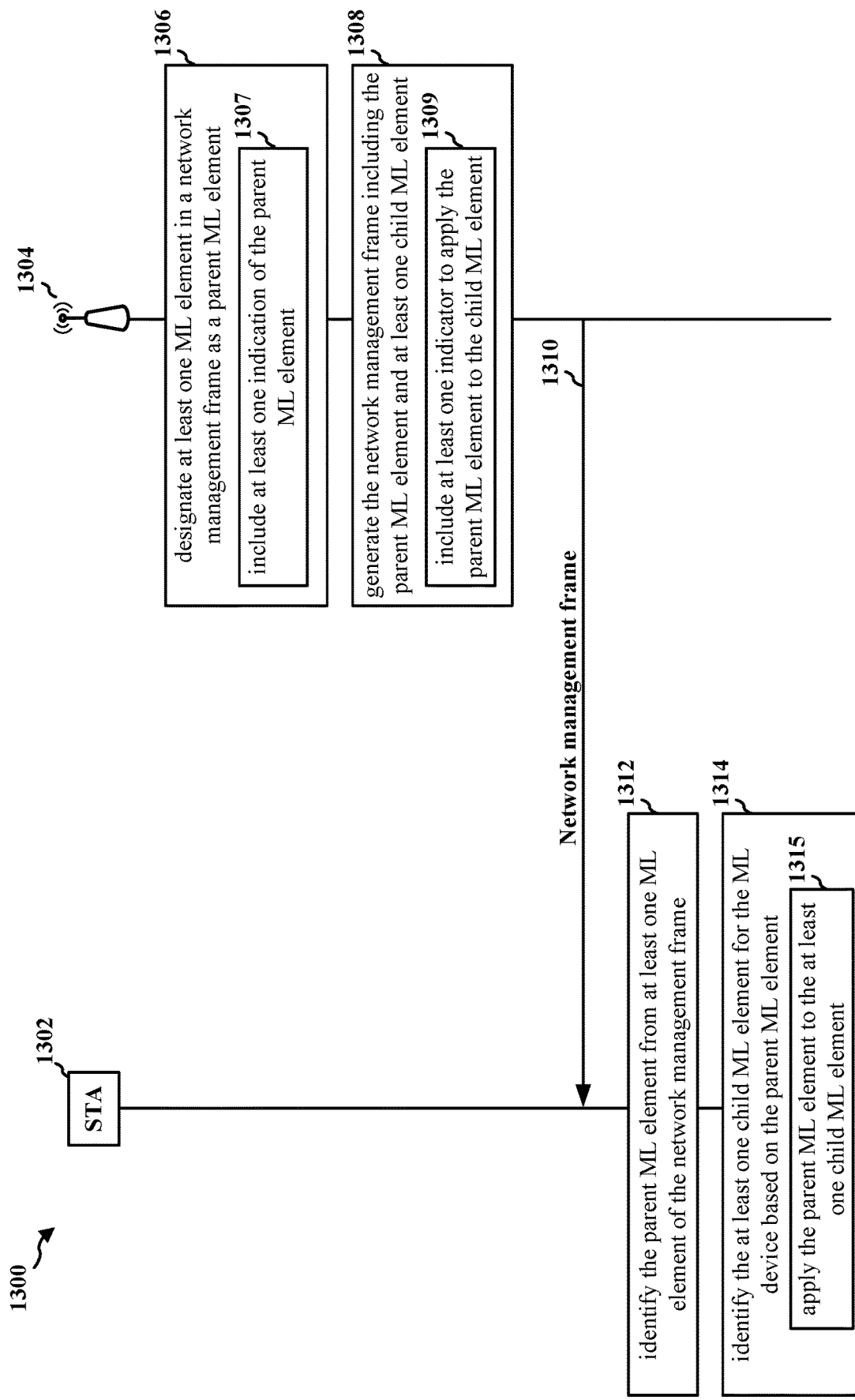
FIG. 13 is a call-flow diagram of a method of wireless communication.

FIG. 13 is a call-flow diagram 1300 of a method of wireless communication. The call-flow diagram 1300 may include a STA 1302 and an AP 1304. The AP 1304 may be a Tx AP MLD associated with at least one MBSSID, and the Tx AP MLD may be configured to designate a parent ML element and at least one child ML element in the network management frame, e.g., the beacon frame or probe response frame, and broadcast the network management frame to at least one non-AP MLD. The STA 1302 may be at least one non-AP MLD associated with at least one BSSID, and the STA 1302 may be configured to receive the network management frame and apply the parent ML element to the child ML element.

At 1306, the AP 1304 may designate at least one ML element in a network management frame as a parent ML element. The network node may be configured with a plurality of radio links, and each radio link of the plurality of radio links may be configured with the at least one MBSSID associated with the at least one non-AP MLD.

In one aspect, the designation of the parent ML element may be implicit. That is, the AP 1304 may include one ML element in the core frame and at least one MBSSID element, and the one ML element is implicitly designated as the parent ML element. The at least one MBSSID element may also be implicitly designated as the child ML element.

At 1307, the AP 1304 may include at least one indication of the parent ML element in the parent ML element. That is, the designation of the parent ML element may be explicit, and the AP 1304 may include the indicator, e.g., a parent indicator, in a subfield of the ML element to indicate that the corresponding ML element in the core frame is the parent ML element. In one example, the parent indicator may have a first value indicating that the corresponding ML element is a parent ML element. In another example, the parent indicator may have a second value indicating that the corresponding ML element is a child ML element. In another example, a lack of value of the parent indicator may indicate that the corresponding ML element is the child ML element.

At 1308, the AP 1304 may generate the network management frame including the parent ML element and at least one child ML element associated with the parent ML element. That is, based on the designation of the parent ML element and the child ML elements, the AP 1304 may generate the network management frame to omit at least one information in the child ML elements and indicate the non-AP MLDs to apply the corresponding information from the parent ML element to the child ML elements. Here, the network management frame may include a beacon frame or a probe response frame. The AP 1304 may omit the duplicate information in the child ML element that may be applied from the parent ML element in the network management frame.

At 1309, the AP 1304 may include at least one indicator to apply the parent ML element to the child ML element. That is, the AP 1304 may generate the network management frame to indicate the non-AP MLDs to apply at least a part of the parent ML element to the child ML element.

In some aspects, the duplicate information may include at least one per-STA profile of the parent ML element to be applied to the child element. That is, the parent element and the child elements may include at least one per-STA profile that are duplicate information. Accordingly, the network management frame generated by the AP 1304 may include the parent element including the at least one per-STA profile to be applied to the child ML elements, child ML elements with the at least one per-STA profile omitted, and an instruction or indication by the AP 1304 to apply the at least one per-STA profile of the parent element to the child element.

In one aspect, the at least one indication of the parent ML element may indicate the non-AP MLDs to apply one or more sub-elements of the parent ML element to the at least one child ML element. In one aspect, a type of the network management frame may indicate the non-AP MLDs to apply one or more sub-elements of the parent ML element to the at least one child ML element. That is, the AP 1304 and the non-AP MLDs may have an agreement to apply or duplicate the information of the parent ML element to the child ML element based on the type of the network management frame. For example, a network management frame of a network configuration updates that may affect all or most of the BSSIDs on a link, e.g., channel switching or channel quieting, may indicate the non-AP MLD to apply or duplicate the information of the parent ML element to the child ML element.

In another aspect, as a part of generating the network management frame, the AP 1304 may include an indicator in the parent ML element to signal that the per-STA profile in the corresponding parent ML element applies to the at least one child ML element. That is, the indicator in the parent ML element may indicate the non-AP MLD to apply the per-STA profile to all the child ML elements that are applicable. For example, at least one of the ML control field, the control information field, or the Per-STA profile may include a one-bit indication indicating to apply or duplicate the information of the parent ML element to all the child ML element that are applicable.

In another aspect, as a part of generating the network management frame, the AP 1304 may include an indicator in a child ML element to signal that the per-STA profile in the parent ML element applies to the corresponding the child ML element. In one example, the indicator may be included in the STA 1302 control field of the child ML element. That is, the STA 1302 control field may include link ID subfield and copy_from_subfield, and the link ID subfield and copy-_from_subfield may indicate the per-STA profile of the parent ML element to be copied to the corresponding child ML element. In another example, the indicator in the child ML element may be included in an ML control field or a common information field of the child ML element to indicate the non-AP MLD to apply the per-STA profile of the parent ML element to the child ML element.

In some aspects, the duplicate information may include at least one common information of the parent ML element to be applied to the child element. That is, the duplicate information of the parent ML element to be applied to the child element may include the common information subfields of the at least one BSSID.

In one aspect, the indicator may be a bitmap in a common information field of the at least one child ML element, the bitmap, e.g., duplication indicator subfield, indicating at least a part of the common information subfields of the parent ML element to be applied to the at least one child ML element. For example, each bit of the duplication indicator subfield may be associated with, in the order of, the Link ID Info subfield, the BPCC subfield, the MSD Info subfield, the EML capabilities subfield, the MLD capabilities subfield, and 3 reserved subfields. Here, each bit value of the duplication indicator subfield may indicate whether the corresponding subfield is applied from the common information field of the parent ML element to the child ML element.

In another aspect, the common information may include a reference MLD MAC address associated with the AP 1304. That is, the reference MLD MAC address may be provided in the parent ML element, and the non-AP MLD may derive the MLD MAC address of the child ML element based on the reference MLD MAC address. For example, for the reference MLD MAC address A0-A1-A2-A3-A4-A5, the non-TxBSSID MLD MAC address (i) may be defined as A0-A1-A2-A3-A4-A5(i), where the A5(i) may be defined as A5(i)=A5−B+((B+i)mod $2^n$), where B is defined as B=A5 mod $2^n$, and n refers to the maximum number of BSSID from the MaxBSSID indicator field of the child ML element, and i refers to the MBSSID index from the MBSSID index field of the child ML element, which may be equal to the MLD ID of the MLD.

In some aspects, the network management frame may be a DTIM beacon frame associated with an EMA, and the DTIM beacon frame may not carry the information of the one or more nonTxBSSIDs of the MBSSID set associated with the at least one child ML element. The DTIM beacon frame may be transmitted at least one frame prior to a subsequent DTIM beacon frame scheduled for the MBSSID associated with the at least one child ML element.

At 1310, the AP 1304 may transmit the network management frame to at least one ML device associated with at least one BSSID of the MBSSID. The STA 1302 may receive the network management frame from a network node configured with a plurality of radio links, each radio link being configured with at least one MBSSID for the ML device.

At 1312, the STA 1302 may identify a parent ML element from at least one ML element of the network management frame. That is, the STA 1302 may identify the parent ML element from the network management frame based on the at least one indication of the parent ML element.

In one aspect, the at least one indication of the parent ML element may be included in the parent ML element. That is, the AP 1304 may explicitly designate the parent ML element, and the STA 1302 may identify the parent ML element based on the indication of the parent ML element. For example, the AP 1304 may include the indicator, e.g., a parent indicator, in a subfield of the ML element to indicate that the corresponding ML element in the core frame is the parent ML element. In one example, the parent indicator may have a first value indicating that the corresponding ML element is a parent ML element. In another example, the parent indicator may have a second value indicating that the corresponding ML element is a child ML element. In another example, a lack of value of the parent indicator may indicate that the corresponding ML element is the child ML element.

In another aspect, the designation of the parent ML element may be implicit. That is, the AP 1304 may include one ML element in the core frame and at least one MBSSID element, and the one ML element is implicitly designated as the parent ML element. The at least one MBSSID element may also be implicitly designated as the child ML element.

At 1314, the STA 1302 may identify the at least one child ML element for the ML device based on the parent ML element. That is, the network management frame may include the parent ML element and the child element with at least one information omitted, and the STA 1302 may apply the omitted information from the parent ML element to the child ML elements. Here, the network management frame may include a beacon frame or a probe response frame.

At 1315, the STA 1302 may apply the parent ML element to the at least one child ML element. Here, the duplicate information to be applied from the parent ML element to the child ML element may include at least one per-STA profile of the parent ML element or at least one common information of the parent ML element.

In some aspects, the duplicate information may include at least one per-STA profile of the parent ML element to be applied to the child element. That is, the parent element and the child elements may include at least one per-STA profile that are duplicate information. Accordingly, the network management frame received from the AP 1304 may include the parent element including the at least one per-STA profile to be applied to the child ML elements, child ML elements with the at least one per-STA profile omitted, and the STA 1302 may apply the at least one per-STA profile of the parent element to the child element based on an instruction or indication by the AP 1304. The STA 1302 may apply the per-STA profile of the parent ML element to the child ML element.

In one aspect, the at least one indication of the parent ML element may indicate the non-AP MLDs to apply one or more sub-elements of the parent ML element to the at least one child ML element. In one aspect, a type of the network management frame may indicate the non-AP MLDs to apply one or more sub-elements of the parent ML element to the at least one child ML element. That is, the AP 1304 and the non-AP MLDs may have an agreement to apply or duplicate the information of the parent ML element to the child ML element based on the type of the network management frame. For example, a network management frame of a network configuration updates that may affect all or most of the BSSIDs on a link, e.g., channel switching or channel quieting, may indicate the non-AP MLD to apply or duplicate the information of the parent ML element to the child ML element.

In another aspect, the indicator in the parent ML element may signal that the per-STA profile in the corresponding parent ML element applies to the at least one child ML element, and the STA 1302 may apply the parent ML element to the at least one child ML element based on the indicator in the parent ML element. That is, the indicator in the parent ML element may indicate the non-AP MLD to apply the per-STA profile to all the child ML elements that are applicable. For example, at least one of the ML control field, the control information field, or the Per-STA profile may include a one-bit indication indicating to apply or duplicate the information of the parent ML element to all the child ML element that are applicable.

In another aspect, the indicator may be included in the child ML element to signal that the per-STA profile in the parent ML element applies to the corresponding the child ML element, and the STA 1302 may apply the parent ML element to the at least one child ML element based on the indicator in the child ML element. In one example, the indicator may be included in the STA 1302 control field of the child ML element. That is, the STA 1302 control field may include link ID subfield and copy_from_subfield, and the link ID subfield and copy_from_subfield may indicate the per-STA profile of the parent ML element associated with the at least one BSSID to be copied to the corresponding child ML element. In another example, the indicator in the child ML element may be included in an ML control field or a common information field of the child ML element to indicate the non-AP MLD to apply the per-STA profile of the parent ML element to the child ML element.

In some aspects, the duplicate information may include at least one common information of the parent ML element to be applied to the child element. That is, the duplicate information of the parent ML element to be applied to the child element may include the common information subfields of the at least one BSSID, and the STA 1302 may apply the common information of the parent ML element to the child ML element.

In one aspect, the indicator may be a bitmap in a common information field of the at least one child ML element, the bitmap, e.g., duplication indicator subfield, indicating at least a part of the common information subfields of the parent ML element to be applied to the at least one child ML element. For example, each bit of the duplication indicator subfield may be associated with, in the order of, the Link ID Info subfield, the BPCC subfield, the MSD Info subfield, the EML capabilities subfield, the MLD capabilities subfield, and 3 reserved subfields. Here, each bit value of the duplication indicator subfield may indicate whether the corresponding subfield is applied from the common information field of the parent ML element to the child ML element. Accordingly, the STA 1302 may apply the subfield of the common information field of the parent ML element based on the bitmap in the common information field of the at least one child ML element.

In another aspect, the common information may include a reference MLD MAC address associated with the AP 1304, and the STA 1302 may derive the MLD MAC address of the child ML element based on the reference MLD MAC address. That is, the reference MLD MAC address may be provided in the parent ML element, and the non-AP MLD may derive the MLD MAC address of the child ML element based on the reference MLD MAC address. For example, for the reference MLD MAC address A0-A1-A2-A3-A4-A5, the non-TxBSSID MLD MAC address (i) may be defined as A0-A1-A2-A3-A4-A5(i), where the A5(i) may be defined as $A5(i)=A5-B+((B+i) \bmod 2^n)$, where B is defined as $B=A5 \bmod 2^n$, and n refers to the maximum number of BSSID from the MaxBSSID indicator field of the child ML element, and i refers to the MBSSID index from the MBSSID index field of the child ML element, which may be equal to the MLD ID of the MLD.

In some aspects, the network management frame may be a DTIM beacon frame associated with an EMA, and the DTIM beacon frame may not carry the information of the one or more nonTxBSSIDs of the MBSSID set associated with the at least one child ML element. The DTIM beacon frame may be transmitted at least one frame prior to a subsequent DTIM beacon frame scheduled for the MBSSID associated with the at least one child ML element.

Figure 14:
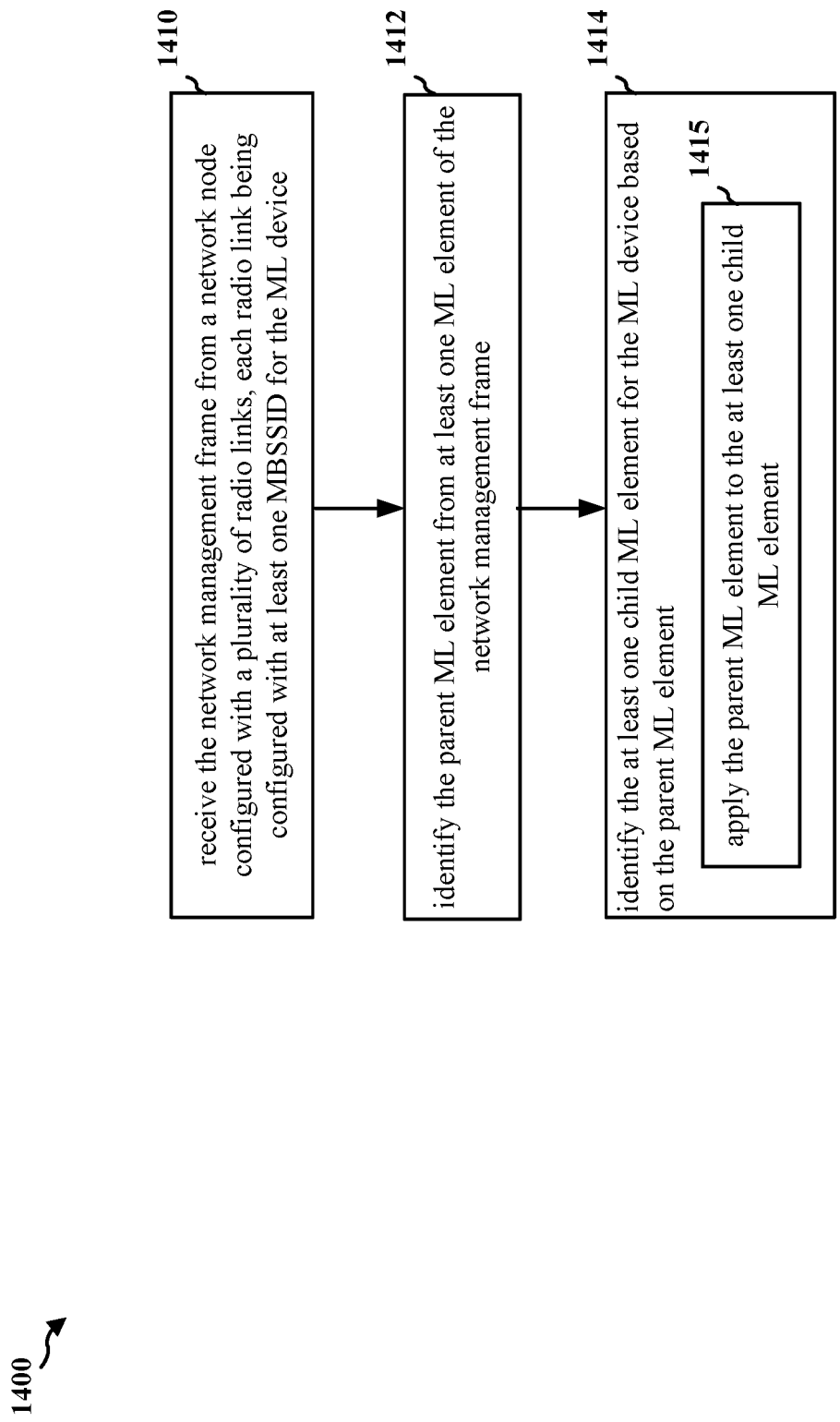
FIG. 14 is a flowchart of a method of wireless communication.

FIG. 14 is a flowchart 1400 of a method of wireless communication. The method may be performed by a STA (e.g., the STA 104; the apparatus 1802). Here, the STA may be at least one non-AP MLD associated with at least one BSSID. The STA may receive the network management frame and apply the parent ML element to the child ML element.

At 1410, the STA may receive the network management frame from a network node configured with a plurality of radio links, each radio link being configured with at least one MBSSID for the ML device. For example, at 1310, the STA 1302 may receive the network management frame from a network node configured with a plurality of radio links, each radio link being configured with at least one MBSSID for the ML device. Furthermore, 1410 may be performed by an ML element component 1840.

At 1412, the STA may identify a parent ML element from at least one ML element of the network management frame. That is, the STA may identify the parent ML element from the network management frame based on the at least one indication of the parent ML element. For example, at 1312, the STA 1302 may identify a parent ML element from at least one ML element of the network management frame. Furthermore, 1412 may be performed by the ML element component 1840.

In one aspect, the at least one indication of the parent ML element may be included in the parent ML element. That is, the AP may explicitly designate the parent ML element, and the STA may identify the parent ML element based on the indication of the parent ML element. For example, the AP may include the indicator, e.g., a parent indicator, in a subfield of the ML element to indicate that the corresponding ML element in the core frame is the parent ML element. In one example, the parent indicator may have a first value indicating that the corresponding ML element is a parent ML element. In another example, the parent indicator may have a second value indicating that the corresponding ML element is a child ML element. In another example, a lack of value of the parent indicator may indicate that the corresponding ML element is the child ML element.

In another aspect, the designation of the parent ML element may be implicit. That is, the AP may include one ML element in the core frame and at least one MBSSID element, and the one ML element is implicitly designated as the parent ML element. The at least one MBSSID element may also be implicitly designated as the child ML element.

At 1414, the STA may identify the at least one child ML element for the ML device based on the parent ML element. That is, the network management frame may include the parent ML element and the child element with at least one information omitted, and the STA may apply the omitted information from the parent ML element to the child ML elements. Here, the network management frame may include a beacon frame or a probe response frame. For example, at 1314, the STA 1302 may identify the at least one child ML element for the ML device based on the parent ML element. Furthermore, 1414 may be performed by the ML element component 1840.

At 1415, the STA may apply the parent ML element to the at least one child ML element. Here, the duplicate information to be applied from the parent ML element to the child ML element may include at least one per-STA profile of the parent ML element or at least one common information of the parent ML element. For example, at 1315, the STA 1302 may apply the parent ML element to the at least one child ML element. Furthermore, 1415 may be performed by the ML element component 1840.

In some aspects, the duplicate information may include at least one per-STA profile of the parent ML element to be applied to the child element. That is, the parent element and the child elements may include at least one per-STA profile that are duplicate information. Accordingly, the network management frame received from the AP may include the parent element including the at least one per-STA profile to be applied to the child ML elements, child ML elements with the at least one per-STA profile omitted, and the STA may apply the at least one per-STA profile of the parent element to the child element based on an instruction or indication by the AP. The STA may apply the per-STA profile of the parent ML element to the child ML element.

In one aspect, the at least one indication of the parent ML element may indicate the non-AP MLDs to apply one or more sub-elements of the parent ML element to the at least one child ML element. In one aspect, a type of the network management frame may indicate the non-AP MLDs to apply one or more sub-elements of the parent ML element to the at least one child ML element. That is, the AP and the non-AP MLDs may have an agreement to apply or duplicate the information of the parent ML element to the child ML element based on the type of the network management frame. For example, a network management frame of a network configuration updates that may affect all or most of the BSSIDs on a link, e.g., channel switching or channel quieting, may indicate the non-AP MLD to apply or duplicate the information of the parent ML element to the child ML element.

In another aspect, the indicator in the parent ML element may signal that the per-STA profile in the corresponding parent ML element applies to the at least one child ML element, and the STA may apply the parent ML element to the at least one child ML element based on the indicator in the parent ML element. That is, the indicator in the parent ML element may indicate the non-AP MLD to apply the per-STA profile to all the child ML elements that are applicable. For example, at least one of the ML control field, the control information field, or the Per-STA profile may include a one-bit indication indicating to apply or duplicate the information of the parent ML element to all the child ML element that are applicable.

In another aspect, the indicator may be included in the child ML element to signal that the per-STA profile in the parent ML element applies to the corresponding the child ML element, and the STA may apply the parent ML element to the at least one child ML element based on the indicator in the child ML element. In one example, the indicator may be included in the STA control field of the child ML element. That is, the STA control field may include link ID subfield and copy_from_subfield, and the link ID subfield and copy_from_subfield may indicate the per-STA profile of the parent ML element associated with the at least one BSSID to be copied to the corresponding child ML element. In another example, the indicator in the child ML element may be included in an ML control field or a common information field of the child ML element to indicate the non-AP MLD to apply the per-STA profile of the parent ML element to the child ML element.

In some aspects, the duplicate information may include at least one common information of the parent ML element to be applied to the child element. That is, the duplicate information of the parent ML element to be applied to the child element may include the common information subfields of the at least one BSSID, and the STA may apply the common information of the parent ML element to the child ML element.

In one aspect, the indicator may be a bitmap in a common information field of the at least one child ML element, the bitmap, e.g., duplication indicator subfield, indicating at least a part of the common information subfields of the parent ML element to be applied to the at least one child ML element. For example, each bit of the duplication indicator subfield may be associated with, in the order of, the Link ID Info subfield, the BPCC subfield, the MSD Info subfield, the EML capabilities subfield, the MLD capabilities subfield, and 3 reserved subfields. Here, each bit value of the duplication indicator subfield may indicate whether the corresponding subfield is applied from the common information field of the parent ML element to the child ML element.

Accordingly, the STA may apply the subfield of the common information field of the parent ML element based on the bitmap in the common information field of the at least one child ML element.

In another aspect, the common information may include a reference MLD MAC address associated with the AP, and the STA may derive the MLD MAC address of the child ML element based on the reference MLD MAC address. That is, the reference MLD MAC address may be provided in the parent ML element, and the non-AP MLD may derive the MLD MAC address of the child ML element based on the reference MLD MAC address. For example, for the reference MLD MAC address A0-A1-A2-A3-A4-A5, the non-TxBSSID MLD MAC address (i) may be defined as A0-A1-A2-A3-A4-A5(i), where the A5(i) may be defined as A5(i)= A5−B+((B+i)mod $2^n$), where B is defined as B=A5 mod $2^n$, and n refers to the maximum number of BSSID from the MaxBSSID indicator field of the child ML element, and i refers to the MBSSID index from the MBSSID index field of the child ML element, which may be equal to the MLD ID of the MLD.

In some aspects, the network management frame may be a DTIM beacon frame associated with an EMA, and the DTIM beacon frame may not carry the information of the one or more nonTxBSSIDs of the MBSSID set associated with the at least one child ML element. The DTIM beacon frame may be transmitted at least one frame prior to a subsequent DTIM beacon frame scheduled for the MBSSID associated with the at least one child ML element.

Figure 15:
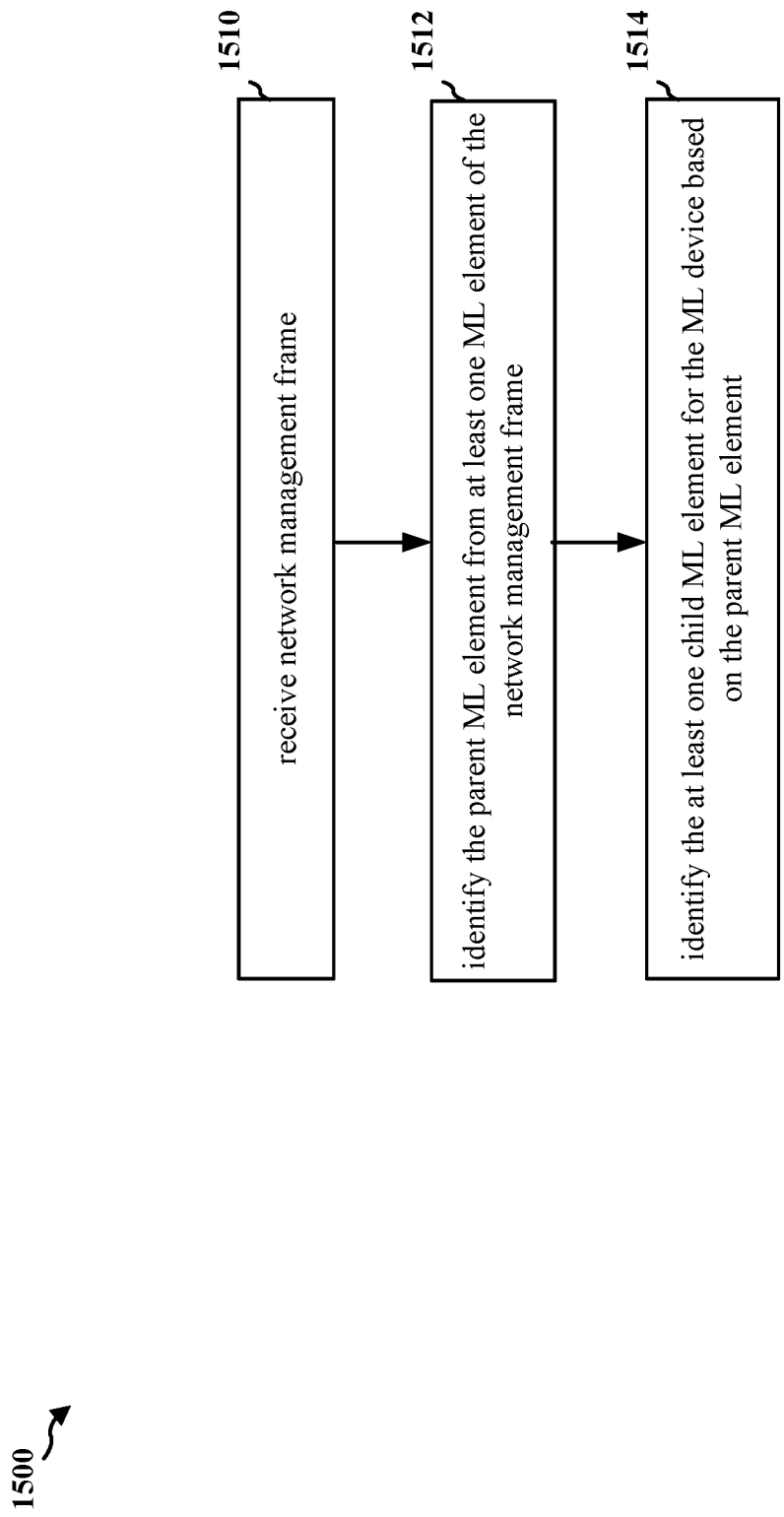
FIG. 15 is a flowchart of a method of wireless communication.

FIG. 15 is a flowchart 1500 of a method of wireless communication. The method may be performed by a STA (e.g., the STA 104; the apparatus 1802). Here, the STA may be at least one non-AP MLD associated with at least one BSSID. The STA may receive the network management frame and apply the parent ML element to the child ML element.

At 1510, the STA may receive the network management frame from a network node configured with a plurality of radio links, each radio link being configured with at least one MBSSID for the ML device. For example, at 1310, the STA 1302 may receive the network management frame from a network node configured with a plurality of radio links, each radio link being configured with at least one MBSSID for the ML device. Furthermore, 1510 may be performed by an ML element component 1840.

At 1512, the STA may identify a parent ML element from at least one ML element of the network management frame. That is, the STA may identify the parent ML element from the network management frame based on the at least one indication of the parent ML element. For example, at 1312, the STA 1302 may identify a parent ML element from at least one ML element of the network management frame. Furthermore, 1512 may be performed by the ML element component 1840.

In one aspect, the at least one indication of the parent ML element may be included in the parent ML element. That is, the AP may explicitly designate the parent ML element, and the STA may identify the parent ML element based on the indication of the parent ML element. For example, the AP may include the indicator, e.g., a parent indicator, in a subfield of the ML element to indicate that the corresponding ML element in the core frame is the parent ML element. In one example, the parent indicator may have a first value indicating that the corresponding ML element is a parent ML element. In another example, the parent indicator may have a second value indicating that the corresponding ML element is a child ML element. In another example, a lack of value of the parent indicator may indicate that the corresponding ML element is the child ML element.

In another aspect, the designation of the parent ML element may be implicit. That is, the AP may include one ML element in the core frame and at least one MBSSID element, and the one ML element is implicitly designated as the parent ML element. The at least one MBSSID element may also be implicitly designated as the child ML element.

At 1514, the STA may identify the at least one child ML element for the ML device based on the parent ML element. That is, the network management frame may include the parent ML element and the child element with at least one information omitted, and the STA may apply the omitted information from the parent ML element to the child ML elements. Here, the network management frame may include a beacon frame or a probe response frame. For example, at 1314, the STA 1302 may identify the at least one child ML element for the ML device based on the parent ML element. Furthermore, 1514 may be performed by the ML element component 1840.

Figure 16:
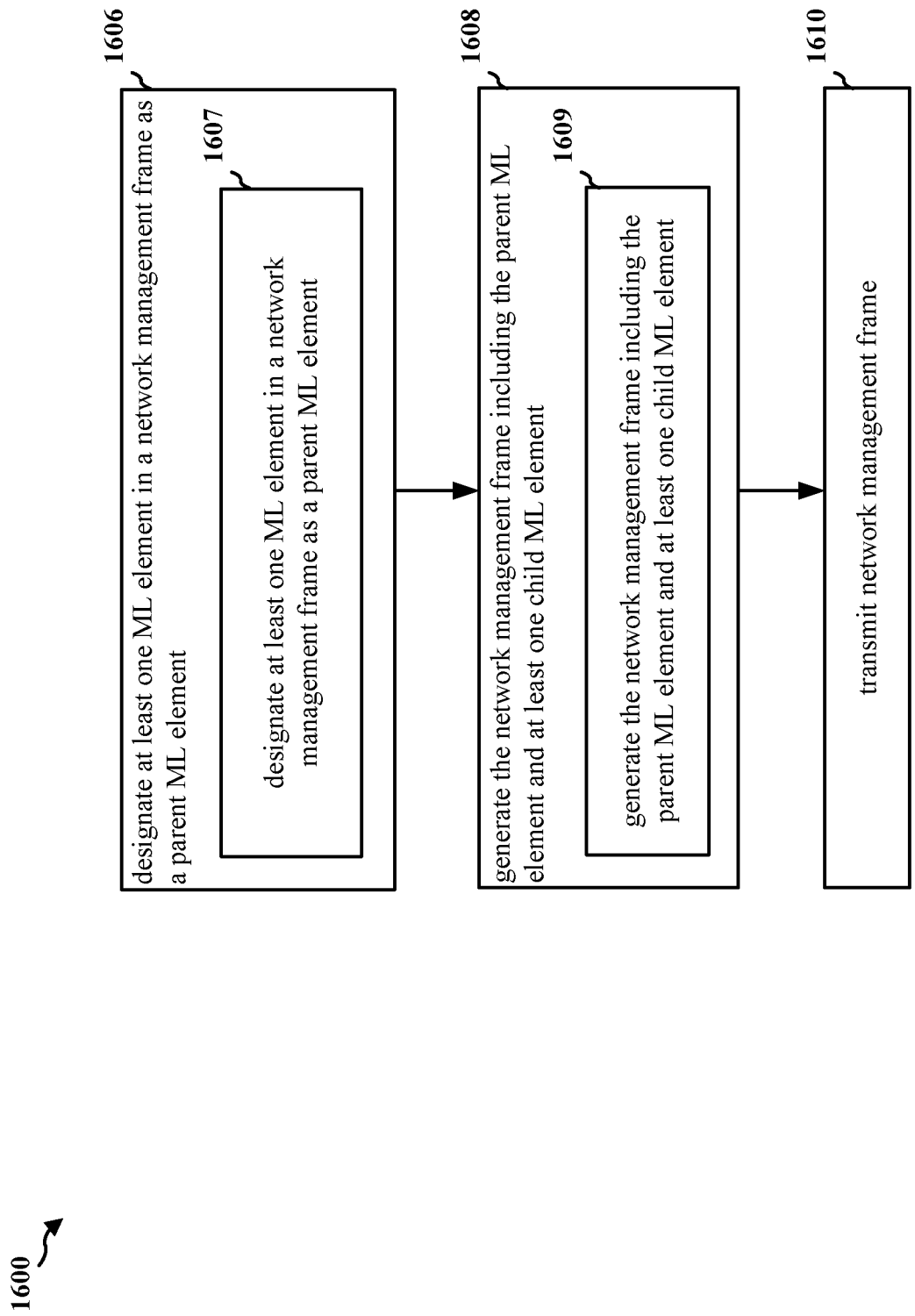
FIG. 16 is a flowchart of a method of wireless communication.

FIG. 16 is a flowchart 1600 of a method of wireless communication. The method may be performed by an AP (e.g., the AP 102; the apparatus 1902). The AP may be a Tx AP MLD associated with at least one MBSSID, and the Tx AP MLD may designate a parent ML element and at least one child ML element in the network management frame, e.g., the beacon frame or probe response frame, and broadcast the network management frame to at least one non-AP MLD.

At 1606, the AP may designate at least one ML element in a network management frame as a parent ML element. The network node may be configured with a plurality of radio links, and each radio link of the plurality of radio links may be configured with the at least one MBSSID associated with the at least one non-AP MLD. In one aspect, the designation of the parent ML element may be implicit. That is, the AP may include one ML element in the core frame and at least one MBSSID element, and the one ML element is implicitly designated as the parent ML element. The at least one MBSSID element may also be implicitly designated as the child ML element. For example, at 1306, the AP 1304 may designate at least one ML element in a network management frame as a parent ML element. Furthermore, 1606 may be performed by an ML element component 1940.

At 1607, the AP may include at least one indication of the parent ML element in the parent ML element. That is, the designation of the parent ML element may be explicit, and the AP may include the indicator, e.g., a parent indicator, in a subfield of the ML element to indicate that the corresponding ML element in the core frame is the parent ML element. In one example, the parent indicator may have a first value indicating that the corresponding ML element is a parent ML element. In another example, the parent indicator may have a second value indicating that the corresponding ML element is a child ML element. In another example, a lack of value of the parent indicator may indicate that the corresponding ML element is the child ML element. For example, at 1307, the AP 1304 may include at least one indication of the parent ML element in the parent ML element. Furthermore, 1607 may be performed by the ML element component 1940.

At 1608, the AP may generate the network management frame including the parent ML element and at least one child ML element being associated with the parent ML element. That is, based on the designation of the parent ML element and the child ML elements, the AP may generate the network management frame to omit at least one information in the child ML elements and indicate the non-AP MLDs to apply the corresponding information from the parent ML element to the child ML elements. Here, the network management frame may include a beacon frame or a probe response frame. The AP may omit the duplicate information in the child ML element that may be applied from the parent ML element in the network management frame. For example, at 1308, the AP 1304 may generate the network management frame including the parent ML element, and at least one child ML element associated with the parent ML element. Furthermore, 1608 may be performed by the ML element component 1940.

At 1609, the AP may include at least one indicator to apply the parent ML element to the child ML element. That is, the AP may generate the network management frame to indicate the non-AP MLDs to apply at least a part of the parent ML element to the child ML element. For example, at 1309, the AP 1304 may include at least one indicator to apply the parent ML element to the child ML element. Furthermore, 1609 may be performed by the ML element component 1940.

In some aspects, the duplicate information may include at least one per-STA profile of the parent ML element to be applied to the child element. That is, the parent element and the child elements may include at least one per-STA profile that are duplicate information. Accordingly, the network management frame generated by the AP may include the parent element including the at least one per-STA profile to be applied to the child ML elements, child ML elements with the at least one per-STA profile omitted, and an instruction or indication by the AP to apply the at least one per-STA profile of the parent element to the child element.

In one aspect, the at least one indication of the parent ML element may indicate the non-AP MLDs to apply one or more sub-elements of the parent ML element to the at least one child ML element. In one aspect, a type of the network management frame may indicate the non-AP MLDs to apply one or more sub-elements of the parent ML element to the at least one child ML element. That is, the AP and the non-AP MLDs may have an agreement to apply or duplicate the information of the parent ML element to the child ML element based on the type of the network management frame. For example, a network management frame of a network configuration updates that may affect all or most of the BSSIDs on a link, e.g., channel switching or channel quieting, may indicate the non-AP MLD to apply or duplicate the information of the parent ML element to the child ML element.

In another aspect, as a part of generating the network management frame, the AP may include an indicator in the parent ML element to signal that the per-STA profile in the corresponding parent ML element applies to the at least one child ML element. That is, the indicator in the parent ML element may indicate the non-AP MLD to apply the per-STA profile to all the child ML elements that are applicable. For example, at least one of the ML control field, the control information field, or the Per-STA profile may include a one-bit indication indicating to apply or duplicate the information of the parent ML element to all the child ML element that are applicable.

In another aspect, as a part of generating the network management frame, the AP may include an indicator in a child ML element to signal that the per-STA profile in the parent ML element applies to the corresponding the child ML element. In one example, the indicator may be included in the STA control field of the child ML element. That is, the STA control field may include link ID subfield and copy_from_subfield, and the link ID subfield and copy_from_subfield may indicate the per-STA profile of the parent ML element associated with the at least one BSSID to be copied to the corresponding child ML element. In another example, the indicator in the child ML element may be included in an ML control field or a common information field of the child ML element to indicate the non-AP MLD to apply the per-STA profile of the parent ML element to the child ML element.

In some aspects, the duplicate information may include at least one common information of the parent ML element to be applied to the child element. That is, the duplicate information of the parent ML element to be applied to the child element may include the common information subfields of the at least one BSSID.

In one aspect, the indicator may be a bitmap in a common information field of the at least one child ML element, the bitmap, e.g., duplication indicator subfield, indicating at least a part of the common information subfields of the parent ML element to be applied to the at least one child ML element. For example, each bit of the duplication indicator subfield may be associated with, in the order of, the Link ID Info subfield, the BPCC subfield, the MSD Info subfield, the EML capabilities subfield, the MLD capabilities subfield, and 3 reserved subfields. Here, each bit value of the duplication indicator subfield may indicate whether the corresponding subfield is applied from the common information field of the parent ML element to the child ML element.

In another aspect, the common information may include a reference MLD MAC address associated with the AP 1304. That is, the reference MLD MAC address may be provided in the parent ML element, and the non-AP MLD may derive the MLD MAC address of the child ML element based on the reference MLD MAC address. For example, for the reference MLD MAC address A0-A1-A2-A3-A4-A5, the non-TxBSSID MLD MAC address (i) may be defined as A0-A1-A2-A3-A4-A5(i), where the A5(i) may be defined as A5(i)=A5−B+((B+i)mod $2^n$), where B is defined as B=A5 mod $2^n$, and n refers to the maximum number of BSSID from the MaxBSSID indicator field of the child ML element, and i refers to the MBSSID index from the MBSSID index field of the child ML element, which may be equal to the MLD ID of the MLD.

In some aspects, the network management frame may be a DTIM beacon frame associated with an EMA, and the DTIM beacon frame may not carry the information of the one or more nonTxBSSIDs of the MBSSID set associated with the at least one child ML element. The DTIM beacon frame may be transmitted at least one frame prior to a subsequent DTIM beacon frame scheduled for the MBSSID associated with the at least one child ML element.

At 1610, the AP may transmit the network management frame to at least one ML device associated with at least one BSSID of the MBSSID. For example, at 1310, the AP 1304 may transmit the network management frame to at least one ML device associated with at least one BSSID of the MBSSID. Furthermore, 1610 may be performed by the ML element component 1940.

Figure 17:
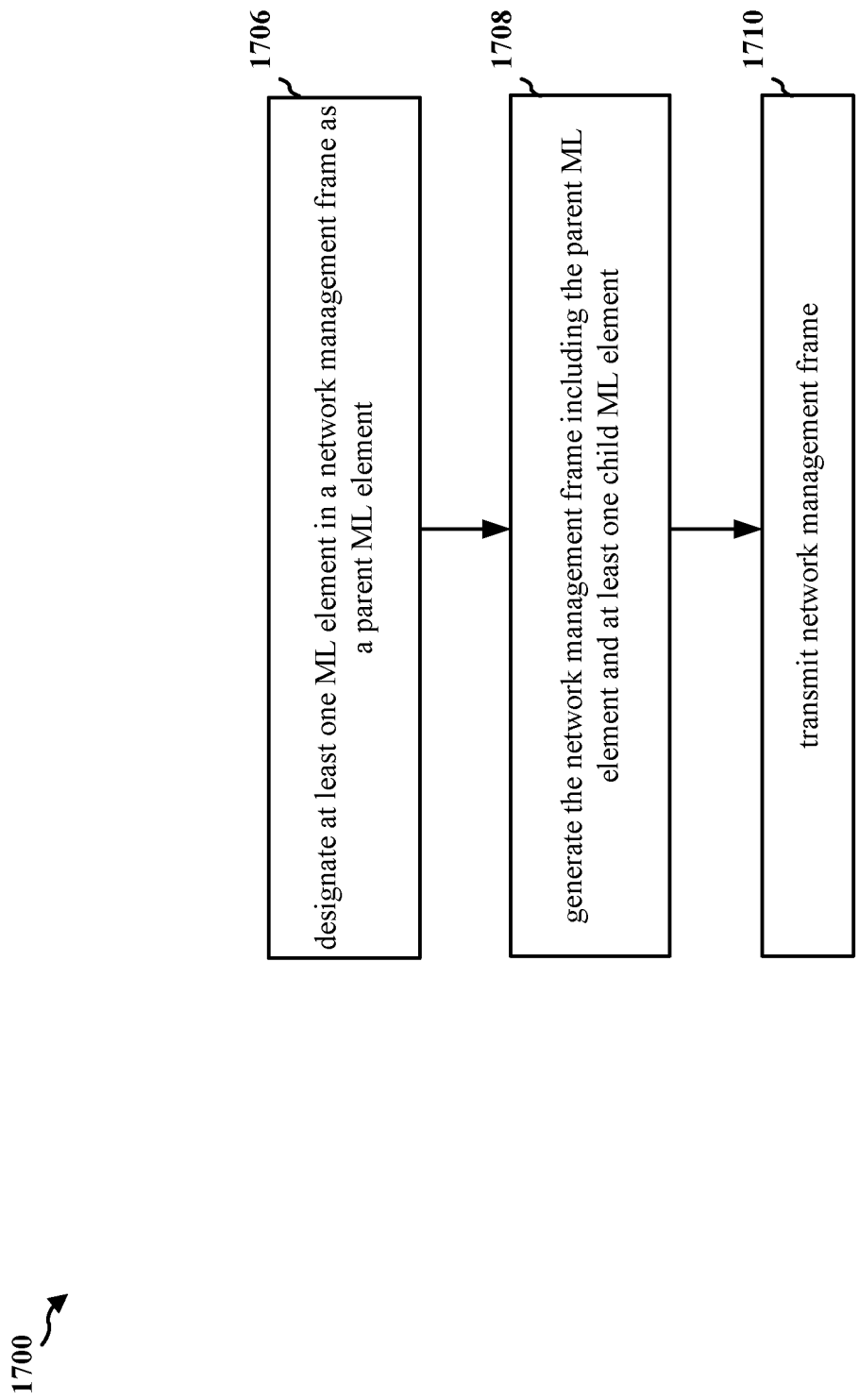
FIG. 17 is a flowchart of a method of wireless communication.

FIG. 17 is a flowchart 1700 of a method of wireless communication. The method may be performed by an AP (e.g., the AP 102; the apparatus 1902). The AP may be a Tx AP MLD associated with at least one MBSSID, and the Tx AP MLD may designate a parent ML element and at least one child ML element in the network management frame, e.g., the beacon frame or probe response frame, and broadcast the network management frame to at least one non-AP MLD.

At 1706, the AP may designate at least one ML element in a network management frame as a parent ML element. The network node may be configured with a plurality of radio links, and each radio link of the plurality of radio links may be configured with the at least one MBSSID associated with the at least one non-AP MLD. In one aspect, the designation of the parent ML element may be implicit. That is, the AP may include one ML element in the core frame and at least one MBSSID element, and the one ML element is implicitly designated as the parent ML element. The at least one MBSSID element may also be implicitly designated as the child ML element. For example, at 1306, the AP 1304 may designate at least one ML element in a network management frame as a parent ML element. Furthermore, 1706 may be performed by an ML element component 1940.

At 1708, the AP may generate the network management frame including the parent ML element and at least one child ML element being associated with the parent ML element. That is, based on the designation of the parent ML element and the child ML elements, the AP may generate the network management frame to omit at least one information in the child ML elements and indicate the non-AP MLDs to apply the corresponding information from the parent ML element to the child ML elements. Here, the network management frame may include a beacon frame or a probe response frame. The AP may omit the duplicate information in the child ML element that may be applied from the parent ML element in the network management frame. For example, at 1308, the AP 1304 may generate the network management frame including the parent ML element, and at least one child ML element associated with the parent ML element. Furthermore, 1708 may be performed by the ML element component 1940.

In some aspects, the duplicate information may include at least one per-STA profile of the parent ML element to be applied to the child element. That is, the parent element and the child elements may include at least one per-STA profile that are duplicate information. Accordingly, the network management frame generated by the AP may include the parent element including the at least one per-STA profile to be applied to the child ML elements, child ML elements with the at least one per-STA profile omitted, and an instruction or indication by the AP to apply the at least one per-STA profile of the parent element to the child element.

In one aspect, the at least one indication of the parent ML element may indicate the non-AP MLDs to apply one or more sub-elements of the parent ML element to the at least one child ML element. In one aspect, a type of the network management frame may indicate the non-AP MLDs to apply one or more sub-elements of the parent ML element to the at least one child ML element. That is, the AP and the non-AP MLDs may have an agreement to apply or duplicate the information of the parent ML element to the child ML element based on the type of the network management frame. For example, a network management frame of a network configuration updates that may affect all or most of the BSSIDs on a link, e.g., channel switching or channel quieting, may indicate the non-AP MLD to apply or duplicate the information of the parent ML element to the child ML element.

In another aspect, as a part of generating the network management frame, the AP may include an indicator in the parent ML element to signal that the per-STA profile in the corresponding parent ML element applies to the at least one child ML element. That is, the indicator in the parent ML element may indicate the non-AP MLD to apply the per-STA profile to all the child ML elements that are applicable. For example, at least one of the ML control field, the control information field, or the Per-STA profile may include a one-bit indication indicating to apply or duplicate the information of the parent ML element to all the child ML element that are applicable.

In another aspect, as a part of generating the network management frame, the AP may include an indicator in a child ML element to signal that the per-STA profile in the parent ML element applies to the corresponding the child ML element. In one example, the indicator may be included in the STA control field of the child ML element. That is, the STA control field may include link ID subfield and copy_from_subfield, and the link ID subfield and copy_from_subfield may indicate the per-STA profile of the parent ML element associated with the at least one BSSID to be copied to the corresponding child ML element. In another example, the indicator in the child ML element may be included in an ML control field or a common information field of the child ML element to indicate the non-AP MLD to apply the per-STA profile of the parent ML element to the child ML element.

In some aspects, the duplicate information may include at least one common information of the parent ML element to be applied to the child element. That is, the duplicate information of the parent ML element to be applied to the child element may include the common information subfields of the at least one BSSID.

In one aspect, the indicator may be a bitmap in a common information field of the at least one child ML element, the bitmap, e.g., duplication indicator subfield, indicating at least a part of the common information subfields of the parent ML element to be applied to the at least one child ML element. For example, each bit of the duplication indicator subfield may be associated with, in the order of, the Link ID Info subfield, the BPCC subfield, the MSD Info subfield, the EML capabilities subfield, the MLD capabilities subfield, and 3 reserved subfields. Here, each bit value of the duplication indicator subfield may indicate whether the corresponding subfield is applied from the common information field of the parent ML element to the child ML element.

In another aspect, the common information may include a reference MLD MAC address associated with the AP 1304. That is, the reference MLD MAC address may be provided in the parent ML element, and the non-AP MLD may derive the MLD MAC address of the child ML element based on the reference MLD MAC address. For example, for the reference MLD MAC address A0-A1-A2-A3-A4-A5, the non-TxBSSID MLD MAC address (i) may be defined as A0-A1-A2-A3-A4-A5(i), where the A5(i) may be defined as $A5(i)=A5-B+((B+i) \mod 2^n)$, where B is defined as $B=A5 \mod 2^n$, and n refers to the maximum number of BSSID from the MaxBSSID indicator field of the child ML element, and i refers to the MBSSID index from the MBSSID index field of the child ML element, which may be equal to the MLD ID of the MLD.

In some aspects, the network management frame may be a DTIM beacon frame associated with an EMA, and the DTIM beacon frame may not carry the information of the one or more nonTxBSSIDs of the MBSSID set associated with the at least one child ML element. The DTIM beacon frame may be transmitted at least one frame prior to a subsequent DTIM beacon frame scheduled for the MBSSID associated with the at least one child ML element.

At 1710, the AP may transmit the network management frame to at least one ML device associated with at least one BSSID of the MBSSID. For example, at 1310, the AP 1304 may transmit the network management frame to at least one ML device associated with at least one BSSID of the MBSSID. Furthermore, 1710 may be performed by the ML element component 1940.

Figure 18:
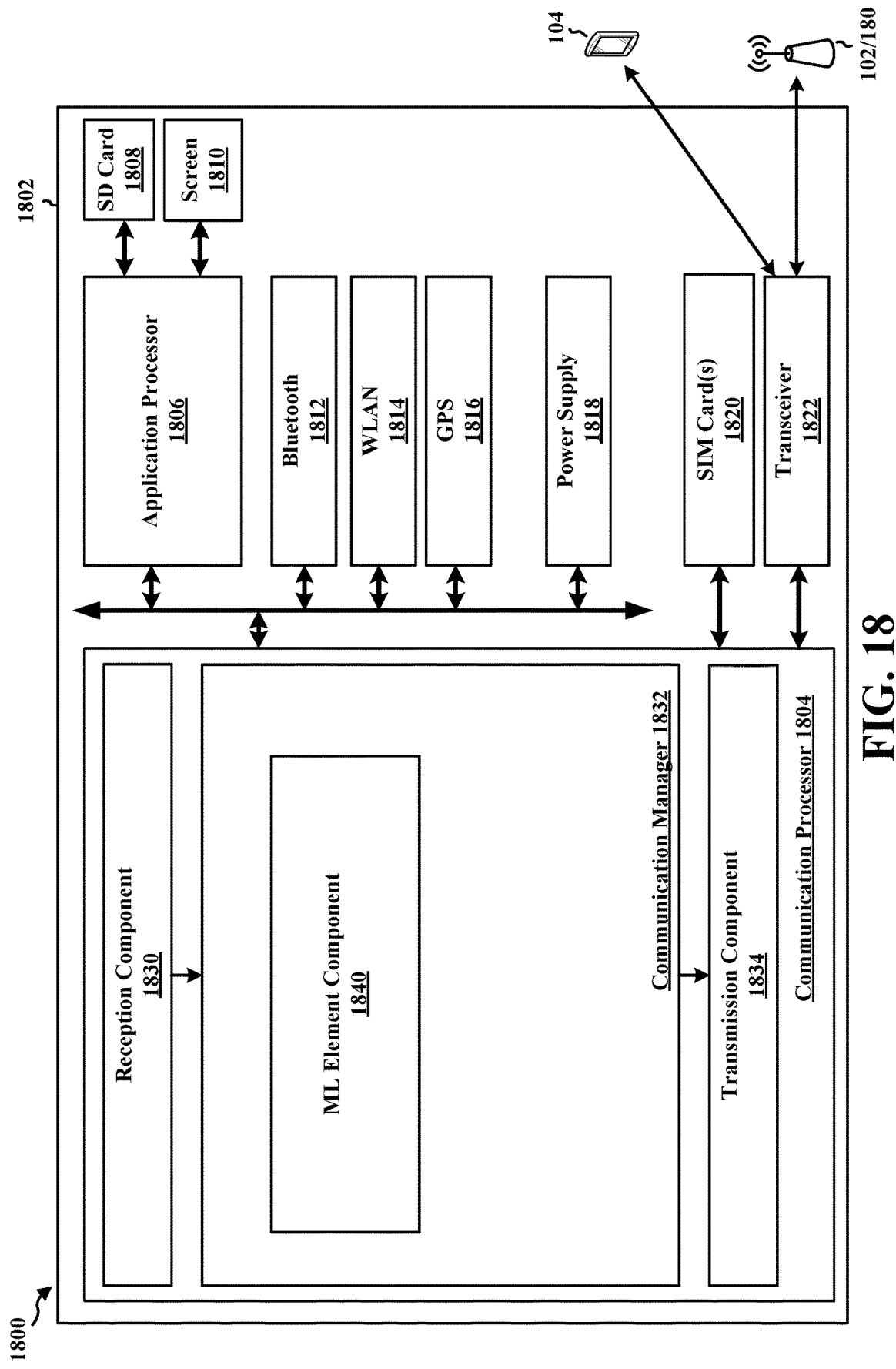
FIG. 18 is a diagram illustrating an example of a hardware implementation for an example apparatus.

FIG. 18 is a diagram 1800 illustrating an example of a hardware implementation for an apparatus 1802. The apparatus 1802 may be a STA, a component of a STA, or may implement STA functionality. In some aspects, the apparatus 1802 may include a communication processor 1804 (also referred to as a modem) coupled to a transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The communication processor 1804 communicates through the transceiver 1822 with the STA 104 and/or AP 102. The communication processor 1804 may include a computer-readable medium/memory. The computer-readable medium/memory may be non-transitory. The communication processor 1804 is responsible for general processing, including the execution of software stored on the computer-readable medium/memory. The software, when executed by the communication processor 1804, causes the communication processor 1804 to perform the various functions described supra. The computer-readable medium/memory may also be used for storing data that is manipulated by the communication processor 1804 when executing software. The communication processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the communication processor 1804. In one configuration, the apparatus 1802 may be a modem chip and include just the communication processor 1804, and in another configuration, the apparatus 1802 may be the entire STA and include the additional modules of the apparatus 1802.

The communication manager 1832 includes an ML element component 1840 that is configured to receive the network management frame from a network node configured with a plurality of radio links, identify a parent ML element from at least one ML element of the network management frame, identify the at least one child ML element for the ML device based on the parent ML element, and apply the parent ML element to the at least one child ML element, e.g., as described in connection with 1410, 1412, 1414, 1415, 1410, 1412, and 1414.

The apparatus may include additional components that perform each of the blocks of the algorithm in the flowcharts of FIGS. 13, 14, and 15. As such, each block in the flowcharts of FIGS. 13, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the communication processor 1804, includes means for receiving a network management frame from a network node configured with a plurality of radio links, each radio link being configured with at least one MBSSID for the ML device, means for identifying a parent ML element from at least one ML element of the network management frame, and means for identifying at least one child ML element based on the parent ML element. The apparatus 1802 includes means for applying at least a part of the parent ML element to the at least one child ML element and means for deriving an MLD MAC address of the at least one child ML element based on the reference MLD MAC address and at least one MBSSID parameter associated with the at least one child ML element. The means may be one or more of the components of the apparatus 1802 configured to perform the functions recited by the means.

Figure 19:
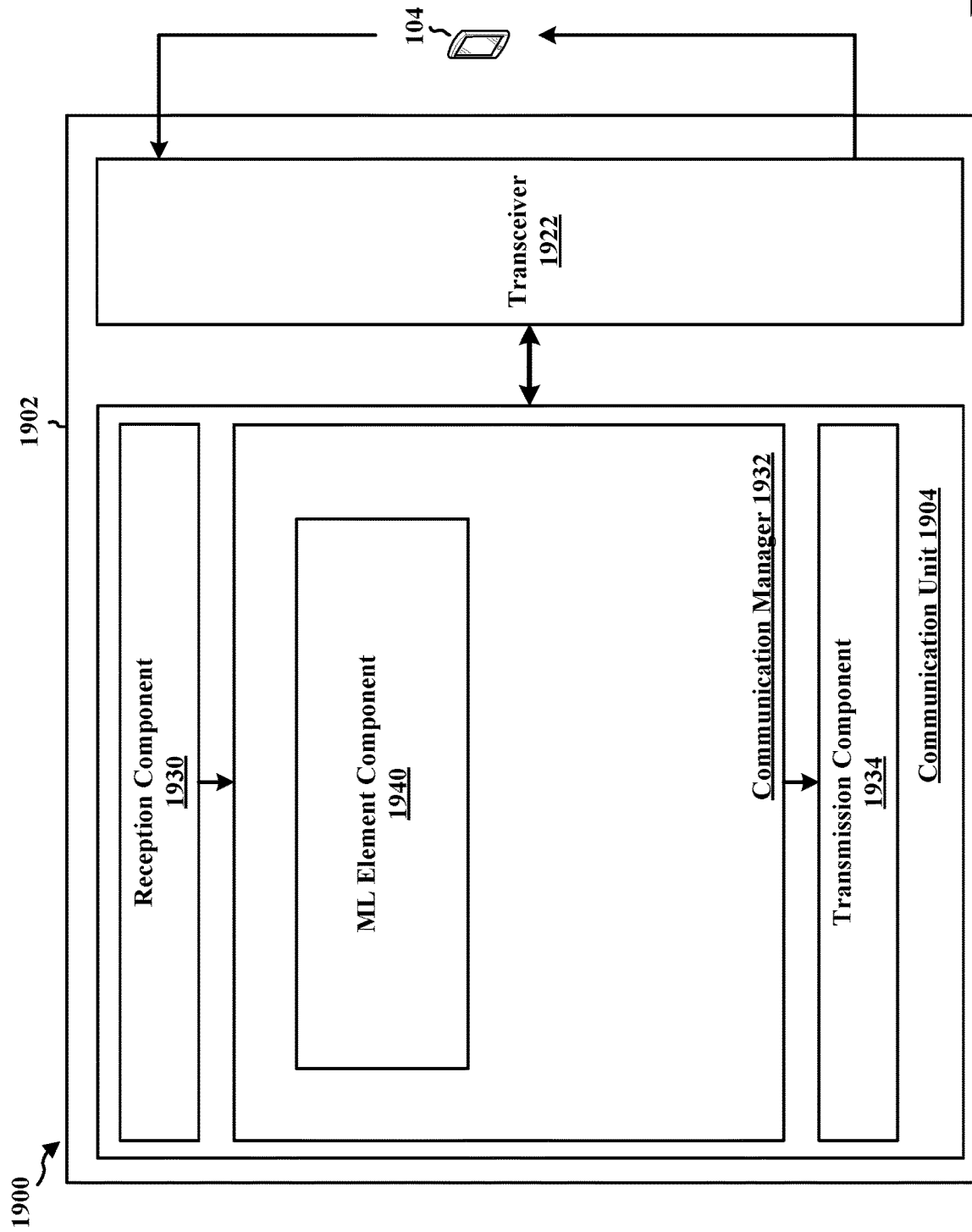
FIG. 19 is a diagram illustrating an example of a hardware implementation for an example apparatus.

FIG. 19 is a diagram 1900 illustrating an example of a hardware implementation for an apparatus 1902. The apparatus 1902 may be an AP, a component of an AP, or may implement AP functionality. In some aspects, the apparatus 1902 may include a communication unit 1904. The communication unit 1904 may communicate through a transceiver 1922 with the STA 104. The communication unit 1904 may include a computer-readable medium/memory. The communication unit 1904 is responsible for general processing, including the execution of software stored on the computer-readable medium/memory. The software, when executed by the communication unit 1904, causes the communication unit 1904 to perform the various functions described supra. The computer-readable medium/memory may also be used for storing data that is manipulated by the communication unit 1904 when executing software. The communication unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the communication unit 1904.

The communication manager 1932 includes an ML element component 1940 that is configured to designate at least one ML element in a network management frame as a parent ML element, include at least one indication of the parent ML element in the parent ML element, generate the network management frame including the parent ML element, at least one child ML element being associated with the parent ML element, include at least one indicator to apply the parent ML element to the child ML element, and transmit the network management frame to at least one ML device associated with at least one BSSID of the MBSSID, e.g., as described in connection with 1606, 1607, 1608, 1609, 1610, 1706, 1708, and 1710.

The apparatus may include additional components that perform each of the blocks of the algorithm in the flowcharts of FIGS. 13, 16, and 17. As such, each block in the flowcharts of FIGS. 13, 16, and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the communication unit 1904, includes means for designating at least one ML element in a network management frame as a parent ML element, means for generating the network management frame including the parent ML element at least one child ML element associated with the parent ML element, means for transmitting the network management frame to at least one ML device associated with at least one BSSID of the at least one MBSSID, and means for including an indicator in the parent ML element to signal that at least a part of the parent ML element applies to the at least one child ML element. The means may be one or more of the components of the apparatus 1902 configured to perform the functions recited by the means.

The method may include a transmitting (Tx) access point (AP) multi-link device (MLD) associated with at least one multi-basic service set identifier (MBSSID) and a non-AP MLD associated with at least one MBSSID. The Tx AP MLD may be configured to designate a parent ML element and at least one child ML element in the network management frame, e.g., the beacon frame or probe response frame, and at least one non-AP MLD may be configured to receive the network management frame and apply the parent ML element to the child ML element.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a network node associated with at least one MBSSID, including designating at least one ML element in a network management frame as a parent ML element, generating the network management frame including the parent ML element, and at least one child ML element associated with the parent ML element, and transmitting the network management frame to at least one ML device associated with at least one BSSID of the MBSSID.

Aspect 2 is the method of aspect 1, where the parent ML element includes at least one indication of the parent ML element.

Aspect 3 is the method of any of aspects 1 or 2, where a type of the network management frame indicates the ML device to apply one or more sub-elements of the parent ML element to the at least one child ML element.

Aspect 4 is the method of any of aspects 1 to 3, where generating the network management frame further includes including an indicator in the parent ML element to signal that a per-STA profile in the parent ML element applies to the at least one child ML element.

Aspect 5 is the method of any of aspects 1 to 4, where the parent ML element includes sub-elements, and generating the network management frame further includes including an indicator in the at least one child ML element to signal that at least a part of one or more sub-elements of the parent ML element applies to the at least one child ML element.

Aspect 6 is the method of aspect 5, where the one or more sub-elements include at least one per-STA profile of the at least one BSSID.

Aspect 7 is the method of aspect 6, where generating the network management frame further includes including the indicator in an ML control field or a common information field of the at least one child ML element for the ML device to apply the at least one per-STA profile to the at least one child ML element.

Aspect 8 is the method of aspect 6, where generating the network management frame further includes including a link ID of a per-STA profile associated with the at least one BSSID in the indicator of the at least one child ML element for the ML device to apply the at least one per-STA profile to the at least one child ML element.

Aspect 9 is the method of aspect 8, where the indicator is in a network control field of the at least one child ML element.

Aspect 10 is the method of aspect 5, where the one or more sub-elements include common information subfields of the at least one BSSID.

Aspect 11 is the method of aspect 10, where the indicator is a bitmap in a common information field of the at least one child ML element, the bitmap indicating at least a part of the common information subfields of the parent ML element to be applied to the at least one child ML element.

Aspect 12 is the method of aspect 10, where the common information subfields include a reference MLD MAC address associated with the network node.

Aspect 13 is the method of any of aspects 1 to 12, where the network management frame is a DTIM beacon frame associated with an EMA, the DTIM beacon frame not being scheduled for an MBSSID associated with the at least one child ML element.

Aspect 14 is the method of aspect 13, where the DTIM beacon frame is transmitted at least one frame prior to a subsequent DTIM beacon frame scheduled for the MBSSID associated with the at least one child ML element.

Aspect 15 is the method of aspect 13, where generating the network management frame further includes including an indicator in the parent ML element to signal that a per-STA profile of the parent ML element applies to the at least one child ML element.

Aspect 16 is the method of any of aspects 1 to 15, where the network node is configured with a plurality of radio links, and each radio link of the plurality of radio links is configured with the at least one MBSSID associated with the at least one ML device.

Aspect 17 is the method of any of aspects 1 to 16, where the network management frame includes a first ML element and at least one MBSSID element, and the first ML element in the network management frame is implicitly designated as the parent ML element, and the at least one MBSSID element is implicitly designated as the at least one child ML element.

Aspect 18 is an apparatus for wireless communication including at least one processor coupled to a memory and configured to implement any of aspects 1 to 17, further including a transceiver coupled to the at least one processor.

Aspect 19 is an apparatus for wireless communication including means for implementing any of aspects 1 to 17.

Aspect 20 is a non-transitory computer-readable medium storing computer executable code, where the code when executed by a processor causes the processor to implement any of aspects 1 to 17.

Aspect 21 is a method of wireless communication at an ML device associated with at least one BSSID, including receiving a network management frame from a network node configured with a plurality of radio links, each radio link being configured with at least one MBSSID for the ML device, identifying a parent ML element from at least one ML element of the network management frame, identifying at least one child ML element based on the parent ML element.

Aspect 22 is the method of aspect 21, where the network management frame includes a first ML element and at least one MBSSID element, and the first ML element in the network management frame is implicitly designated as the parent ML element, and the at least one MBSSID element is implicitly designated as the at least one child ML element.

Aspect 23 is the method of any of aspects 21 or 22, where the parent ML element includes at least one indication of the parent ML element.

Aspect 24 is the method of any of aspects 21 to 23, where the at least one child ML element is identified based on the parent ML element based on a type of the network management frame.

Aspect 25 is the method of any of aspect 24, where identifying the at least one child ML element further includes applying one or more sub-elements of the parent ML element to the at least one child ML element.

Aspect 26 is the method of any of aspects 21 to 25, where the parent ML element includes an indicator to signal that a per-STA profile of the parent ML element applies to the at least one child ML element, and identifying the at least one child ML element further includes applying the per-STA profile of the parent ML element to the at least one child ML element.

Aspect 27 is the method of any of aspects 21 to 26, where the parent ML element includes one or more sub-elements, the at least one child ML element includes an indicator to signal that at least a part of the one or more sub-elements of the parent ML element applies to the at least one child ML element, and the at least one child ML element is identified based on the indicator of the at least one child ML element.

Aspect 28 is the method of aspect 27, where the one or more sub-elements include at least one per-STA profile of the at least one BSSID.

Aspect 29 is the method of aspect 28, where the indicator is in an ML control field or a common information field of the at least one child ML element, and identifying the at least one child ML element further includes applying the at least one per-STA profile to the at least one child ML element.

Aspect 30 is the method of aspect 28, where the indicator of the at least one child ML element includes a link ID of a per-STA profile associated with the at least one BSSID, and identifying the at least one child ML element further includes applying the at least one per-STA profile to the at least one child ML element based on the link ID.

Aspect 31 is the method of aspect 30, where the indicator is in a network control field of the at least one child ML element.

Aspect 32 is the method of aspect 27, where the one or more sub-elements include common information subfields of the at least one BSSID.

Aspect 33 is the method of aspect 32, where the indicator is a bitmap in a common information field of the at least one child ML element, the bitmap indicating at least a part of the common information subfields of the parent ML element to be applied to the at least one child ML element, and identifying the at least one child ML element further includes applying, to the at least one child ML element, the at least a part of the common information subfields associated with the bitmap of the indicator.

Aspect 34 is the method of aspect 32, where the common information subfields include a reference MLD MAC address associated with the network node, and identifying the at least one child ML element further includes deriving an MLD MAC address of the at least one child ML element based on the reference MLD MAC address and at least one MBSSID parameter associated with the at least one child ML element.

Aspect 35 is the method of any of aspects 21 to 34, where the network management frame is a DTIM beacon frame associated with an EMA, the DTIM beacon frame not being scheduled for the at least one MBSSID associated with the at least one child ML element.

Aspect 36 is the method of aspect 35, where the DTIM beacon frame is received at least one frame prior to a subsequent DTIM beacon frame scheduled for the MBSSID associated with the at least one child ML element.

Aspect 37 is the method of aspect 35, where the parent ML element includes an indicator to signal that a per-STA profile of the parent ML element applies to the at least one child ML element, and identifying the at least one child ML element further includes applying the network profile of the parent ML element to the at least one child ML element.

Aspect 38 is an apparatus for wireless communication including at least one processor coupled to a memory and configured to implement any of aspects 21 to 37, further including a transceiver coupled to the at least one processor.

Aspect 39 is an apparatus for wireless communication including means for implementing any of aspects 21 to 37.

Aspect 40 is a non-transitory computer-readable medium storing computer executable code, where the code when executed by a processor causes the processor to implement any of aspects 21 to 37.

What is claimed is:

1. An apparatus for wireless communication at a network node associated with at least one multi-basic service set identifier (MBSSID), comprising:
   memory; and
   at least one processor coupled to the memory and configured to:
   designate at least one multi-link (ML) element in a network management frame as a parent ML element;
   generate the network management frame including:
   the parent ML element; and
   at least one child ML element associated with the parent ML element, wherein the network management frame includes a first ML element and at least one first MBSSID element, and wherein the first ML element in the network management frame is designated as the parent ML element, and the at least one first MBSSID element is designated as the at least one child ML element; and
   transmit the network management frame to at least one ML device associated with at least one basic service set identifier (BSSID) of the at least one MBSSID.

2. The apparatus of claim 1, further comprising a transceiver coupled to the at least one processor,
   wherein the parent ML element includes at least one indication of the parent ML element.

3. The apparatus of claim 1, wherein a type of the network management frame indicates the at least one ML device to apply one or more sub-elements of the parent ML element to the at least one child ML element.

4. The apparatus of claim 1, wherein, to generate the network management frame, the at least one processor is further configured to:
   include an indicator in the parent ML element to signal that a per-station profile in the parent ML element applies to the at least one child ML element.

5. The apparatus of claim 1, wherein the parent ML element includes sub-elements,
   wherein, to generate the network management frame, the at least one processor is further configured to:
   include an indicator in the at least one child ML element to signal that at least a part of one or more sub-elements of the parent ML element applies to the at least one child ML element.

6. The apparatus of claim 5, wherein the one or more sub-elements include at least one per-station profile of the at least one BSSID.

7. The apparatus of claim 6, wherein, to generate the network management frame, the at least one processor is further configured to include a link identifier (ID) of a per-station profile associated with the at least one BSSID in the indicator of the at least one child ML element for the at least one ML device to apply the at least one per-station profile to the at least one child ML element.

8. The apparatus of claim 5, wherein the one or more sub-elements include common information subfields of the at least one BSSID.

9. The apparatus of claim 8, wherein the indicator is a bitmap in a common information field of the at least one child ML element, the bitmap indicating at least a part of the common information subfields of the parent ML element to be applied to the at least one child ML element.

10. The apparatus of claim 8, wherein the common information subfields include a reference multi-link device (MLD) medium access control (MAC) address associated with the network node.

11. The apparatus of claim 1, wherein the network management frame is a delivery traffic indication message (DTIM) beacon frame associated with an enhanced MBSSID advertisement (EMA), the DTIM beacon frame not being scheduled for a first MBSSID associated with the at least one child ML element.

12. The apparatus of claim 11, wherein the DTIM beacon frame is transmitted at least one frame prior to a subsequent DTIM beacon frame scheduled for the first MBSSID associated with the at least one child ML element.

13. The apparatus of claim 11, wherein to generate the network management frame, the at least one processor is further configured to:
include an indicator in the parent ML element to signal that a per-station profile of the parent ML element applies to the at least one child ML element.

14. The apparatus of claim 1,
wherein the first ML element in the network management frame is implicitly designated as the parent ML element, and the at least one first MBSSID element is implicitly designated as the at least one child ML element.

15. A method of wireless communication at a network node associated with at least one multi-basic service set identifier (MBSSID), comprising:
designating at least one multi-link (ML) element in a network management frame as a parent ML element;
generating the network management frame including:
the parent ML element; and
at least one child ML element associated with the parent ML element, wherein the network management frame includes a first ML element and at least one first MBSSID element, and wherein the first ML element in the network management frame is designated as the parent ML element, and the at least one first MBSSID element is designated as the at least one child ML element; and
transmitting the network management frame to at least one ML device associated with at least one basic service set identifier (BSSID) of the at least one MBSSID.

16. An apparatus for wireless communication at a multi-link (ML) device associated with at least one basic service set identifier (BSSID), comprising:
memory; and
at least one processor coupled to the memory and configured to:
receive a network management frame from a network node configured with a plurality of radio links, each radio link being configured with at least one multi-basic service set identifier (MBSSID) for the ML device;
identify a parent ML element from at least one ML element of the network management frame; and
identify at least one child ML element based on the parent ML element, wherein the network management frame includes a first ML element and at least one first MBSSID element, and wherein the first ML element in the network management frame is designated as the parent ML element, and the at least one first MBSSID element is designated as the at least one child ML element.

17. The apparatus of claim 1,
wherein the first ML element in the network management frame is implicitly designated as the parent ML element, and the at least one first MBSSID element is implicitly designated as the at least one child ML element.

18. The apparatus of claim 16, further comprising a transceiver coupled to the at least one processor,
wherein the parent ML element includes at least one indication of the parent ML element.

19. The apparatus of claim 16, wherein the at least one child ML element is identified based on the parent ML element based on a type of the network management frame.

20. The apparatus of claim 19, wherein, to identify the at least one child ML element, the at least one processor is further configured to apply one or more sub-elements of the parent ML element to the at least one child ML element.

21. The apparatus of claim 16, wherein the parent ML element includes an indicator to signal that a per-station profile of the parent ML element applies to the at least one child ML element,
wherein, to identify the at least one child ML element, the at least one processor is further configured to apply the per-station profile of the parent ML element to the at least one child ML element.

22. The apparatus of claim 16, wherein the parent ML element includes one or more sub-elements,
the at least one child ML element includes an indicator to signal that at least a part of the one or more sub-elements of the parent ML element applies to the at least one child ML element, and
the at least one child ML element is identified based on the indicator of the at least one child ML element.

23. The apparatus of claim 22, wherein the one or more sub-elements include at least one per-station profile of the at least one BSSID.

24. The apparatus of claim 23, wherein the indicator of the at least one child ML element includes a link identifier (ID) of a per-station profile associated with the at least one BSSID,
wherein, to identify the at least one child ML element, the at least one processor is further configured to apply the at least one per-station profile to the at least one child ML element based on the link ID.

25. The apparatus of claim 22, wherein the one or more sub-elements include common information subfields of the at least one BSSID.

26. The apparatus of claim 25, wherein the indicator is a bitmap in a common information field of the at least one child ML element, the bitmap indicating at least a part of the common information subfields of the parent ML element to be applied to the at least one child ML element,
wherein, to identify the at least one child ML element, the at least one processor is further configured to apply, to the at least one child ML element, the at least a part of the common information subfields associated with the bitmap of the indicator.

27. The apparatus of claim 25, wherein the common information subfields include a reference multi-link device (MLD) medium access control (MAC) address associated with the network node,
wherein, to identify the at least one child ML element, the at least one processor is further configured to derive an MLD MAC address of the at least one child ML element based on the reference MLD MAC address and at least one MBSSID parameter associated with the at least one child ML element.

28. The apparatus of claim 16, wherein the network management frame is a delivery traffic indication message (DTIM) beacon frame associated with an enhanced MBSSID advertisement (EMA), the DTIM beacon frame not being scheduled for the at least one MBSSID associated with the at least one child ML element.

29. The apparatus of claim 28, wherein the DTIM beacon frame is received at least one frame prior to a subsequent DTIM beacon frame scheduled for the MBSSID associated with the at least one child ML element.

30. A method of wireless communication at a multi-link (ML) device associated with at least one basic service set identifier (BSSID), comprising:
- receiving a network management frame from a network node configured with a plurality of radio links, each radio link being configured with at least one multi-basic service set identifier (MBSSID) for the ML device;
- identifying a parent ML element from at least one ML element of the network management frame; and
- identifying at least one child ML element based on the parent ML element, wherein the network management frame includes a first ML element and at least one first MBSSID element, and wherein the first ML element in the network management frame is designated as the parent ML element, and the at least one first MBSSID element is designated as the at least one child ML element.

* * * * *